(12) United States Patent
Abe

(10) Patent No.: US 6,894,792 B1
(45) Date of Patent: May 17, 2005

(54) PRINT SYSTEM AND JOB MANAGEMENT METHOD FOR THE SAME

(75) Inventor: Masahiko Abe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/205,370

(22) Filed: Dec. 4, 1998

(30) Foreign Application Priority Data

Dec. 5, 1997 (JP) .............................................. 9-335783

(51) Int. Cl.⁷ .............................................. G06F 15/00
(52) U.S. Cl. ..................... 358/1.15; 358/1.13; 358/1.14
(58) Field of Search .............................. 358/1.1, 1, 12, 358/1.13, 1.14, 1.15, 448, 468; 347/3

(56) References Cited

U.S. PATENT DOCUMENTS

| | | | | |
|---|---|---|---|---|
| 5,511,150 A | * | 4/1996 | Beaudet et al. ............. | 395/113 |
| 5,625,757 A | * | 4/1997 | Kageyama et al. ......... | 395/113 |
| 5,669,040 A | * | 9/1997 | Hisatake ..................... | 399/83 |
| 5,995,723 A | * | 11/1999 | Sperry et al. ............... | 395/114 |
| 6,026,258 A | * | 2/2000 | Fresk et al. .................... | 399/87 |
| 6,089,765 A | * | 7/2000 | Mori ........................... | 400/61 |
| 6,130,757 A | * | 10/2000 | Yoshida et al. ............. | 358/1.15 |
| 6,226,096 B1 | * | 5/2001 | Ouchi ......................... | 358/1.14 |
| 6,229,620 B1 | * | 5/2001 | Makitani et al. ........... | 358/1.15 |
| 6,252,681 B1 | * | 6/2001 | Gusmano et al. ........... | 358/468 |
| 6,571,293 B1 | * | 5/2003 | Hong ........................... | 709/232 |

FOREIGN PATENT DOCUMENTS

| | | | |
|---|---|---|---|
| JP | 1-223530 | 9/1989 | |
| JP | 5-30264 | * 5/1993 | ............ H04N/1/00 |
| JP | 7-121325 | 5/1995 | |
| JP | 7-303163 | 11/1995 | |
| JP | 8-290638 | 11/1996 | |

* cited by examiner

Primary Examiner—Mark Wallerson
(74) Attorney, Agent, or Firm—Finnegan, Henderson, Farabow, Garrett & Dunner, L.L.P.

(57) ABSTRACT

A print system is provided with job information integration means for integrating the copy job management information contained in an image forming device and the print job management information contained in a print control device into integrated job management information of the copy and print jobs printed by the image forming device, and job information display means for listing the copy job and print job management information on a display based on the integrated job management information provided by the job information integration means.

12 Claims, 22 Drawing Sheets

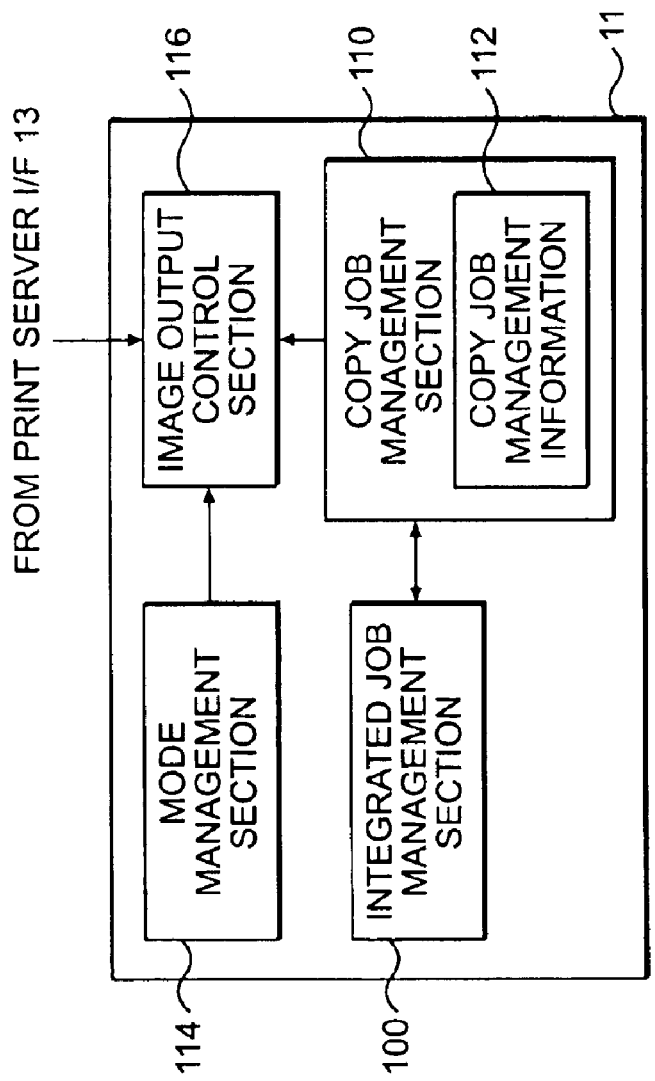

| JOB NAME | STATUS | OWNER | SIZE | NUMBER OF PAGES | NUMBER OF COPIES |
|---|---|---|---|---|---|
| PATENT SPECIFICATION | print | abe | 255K | 12 | 2 |
| WEEKLY REPORT | 1st | abe | 98K | 1 | 1 |
| SYSTEM DIAGRAM | 2nd | abe | 23K | 1 | 1 |

| JOB TYPE | JOB NAME | STATUS | OWNER | SIZE | NUMBER OF PAGES | NUMBER OF COPIES |
|---|---|---|---|---|---|---|
| print | PATENT SPECIFICATION | print | abe | 255K | 12 | 2 |
| print | Weekly Report | 1st | abe | 98K | 1 | 1 |
| print | SYSTEM DIAGRAM | 2nd | abe | 23K | 1 | 1 |
| copy | copy23 | wait | yama | 123K | 5 | 20 |

*FIG. 7*

JOB QUEUE

| JOB TYPE | ID | JOB NAME | STATUS | OWNER | SIZE | PAGE | COPY |
|---|---|---|---|---|---|---|---|
| Print | 31 | PATENT SPECIFICATION | Print | abe | 255K | 12 | 2 |
| Print | 32 | Weekly Report | 1st | abe | 98K | 1 | 1 |
| Print | 33 | SYSTEM DIAGRAM | 2nd | abe | 23K | 1 | 1 |
| Copy | 23 | copy23 | wait | yama | 123K | 5 | 20 |

[MOVE] [RESTART] [SUSPEND] [DELETE] [DISPLAY]

[SET] [PRINT JOB PRIORITY MODE 1 ▽]

530-6

500

PRESS "DISPLAY" BUTTON

DISPLAY OPTIONS

- ☑ JOB NAME
- ☑ JOB OWNER
- ☑ JOB DATA SIZE
- ☑ NUMBER OF JOB PAGES
- ☑ NUMBER OF JOB COPIES
- ☐ PAPER SIZE
- ☐ PAPER TYPE
- ☐ OUTPUT TRAY

[SET] [CANCEL]

| TYPE | ID | STATUS |
|---|---|---|
| Print | 31 | Print |
| Print | 32 | 1st |
| Print | 33 | 2nd(suspend) |
| Print | 34 | 3rd |
| Copy | 23 | wait |

*FIG. 17(a)*

| TYPE | ID | STATUS |
|---|---|---|
| Print | 32 | Print |
| Print | 33 | 1st(suspend) |
| Print | 34 | 2nd |
| Copy | 23 | wait |

*FIG. 17(b)*

| TYPE | ID | STATUS |
|---|---|---|
| Print | 34 | Print |
| Print | 33 | 1st(suspend) |
| Copy | 23 | wait |

| TYPE | ID | STATUS |
|---|---|---|
| Print | 31 | Print |
| Print | 32 | 1st |
| Print | 33 | 2nd |
| Copy | 23 | 3rd |

[MOVE]

FIG. 19(b)

| TYPE | ID | STATUS |
|---|---|---|
| Print | 31 | Print |
| Print | 32 | 1st |
| Print | 33 | 2nd |
| Copy | 23 | 3rd |

[MOVE] ~530-1

FIG. 19(c)

| TYPE | ID | STATUS |
|---|---|---|
| Print | 31 | Print |
| Print | 32 | 1st |
| Print | 33 | 2nd |
| Copy | 23 | 3rd |

[MOVE]

FIG. 19(d)

| TYPE | ID | STATUS |
|---|---|---|
| Print | 31 | Print |
| Print | 32 | 1st |
| Print | 33 | 2nd |
| Copy | 23 | 3rd |

[MOVE]

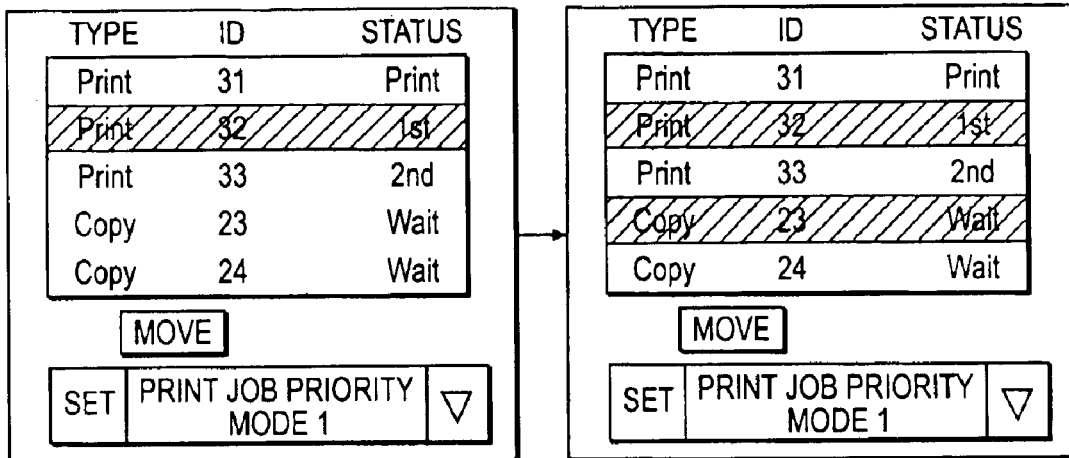
*FIG. 20(a)*  *FIG. 20(b)*
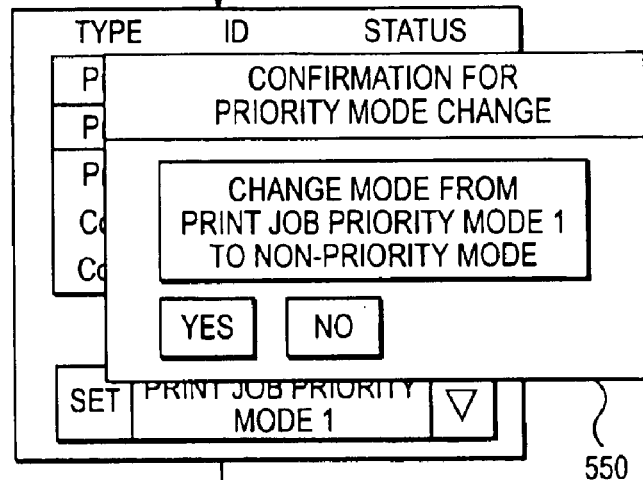
*FIG. 20(c)*
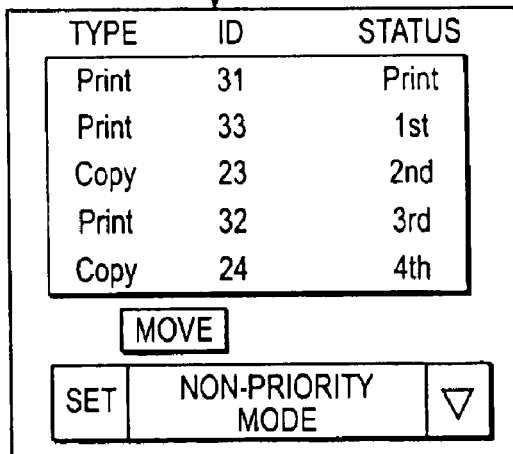
*FIG. 20(d)*

PRINT SYSTEM AND JOB MANAGEMENT METHOD FOR THE SAME

BACKGROUND OF THE INVENTION

The present invention relates to a print system for printing electronic image data on paper and in particular to a print system which comprises an image forming device having both a print function and a copy function as mean for printing.

A digital copier (or a digital color copier) can be grasped as a combination of a reading mechanism for optically reading an original image and preparing digital image data and a printing mechanism for printing the image data on paper. In fact, there is often adopted a development method wherein a reading mechanism and a printing mechanism are developed separately and are combined into a digital copier. The reading mechanism may be called an IIT (image input terminal) and the printing mechanism may be called an IOT (image output terminal).

The printing mechanism of a digital copier is the same as a printer used as output terminal of a computer in point of a function of forming a semipermanent image on paper based on digital image data. Then, an application also occurs wherein a digital copier is connected to a network, or the like, for use as a print engine. In such an application, for example, as shown in FIG. 25, a digital copier 10 is connected to a network 30 such as a LAN (local area network) via a print server 20 as a print control device. The print server 20 has a spooler function of accepting and scheduling print jobs output by client device 40 such as computers and an imaging function of developing a print job into the form of image data that can be processed on the digital copier. When the print server 20 supplies the image data into which the print job is developed to the digital copier, the digital copier prints the image data on paper.

A processing sequence for copying one original is called a copy job in contrast with a print job. The digital copier also used as a printer may have a mode for assigning processing priorities to print and copy jobs. For example, unexamined Japanese Patent Publication No. Hei 5-30264 discloses a digital copier having a local mode giving a higher priority to a copy job and a remote mode giving a higher priority to a print job. This digital copier is connected to a print control module called ESS (analogous to a print server). If a print job processing request comes from the ESS while the digital copier is operating in the local mode, the digital copier returns a signal indicating a busy state to the ESS.

Some digital copiers contain a large-capacity storage unit such as a hard disk drive. This type of digital copier can store image data provided by reading an original on the storage unit and read and print the image data from the storage unit. When the number of copies is two or more, the digital copier reads an original only once at the copy time of the first copy and reads and prints the image data stored on the storage unit at the copy time of the second copy or later. While the second copy or later is printed, only the printing mechanism of the digital copier operates and the reading mechanism stops. Most of the digital copiers of the type can use such idle time of the reading mechanism to previously only read the next original. Such a digital copier stores setup information such as the number of copies and the scaling factor entered through an operation panel in correspondence with the read image data of each page of the original. To print the image data later, the digital copier references the setup information. That is, the print job contents are defined according to a combination of such image data and setup information.

Generally, a print server has a user interface (UI) for displaying the state of each managed print job; or the like, and accepting operation of canceling a print job, changing the processing order, or the like. On the other hand, some digit copiers having a large-capacity storage unit have a UI for displaying the state of each managed print job, or the like, and accepting operation of canceling a print job, or the like. Hitherto, a print system made up of such a print server and digital copier has managed print job information in the print server and copy job information in the digital copier separately. Thus, the print server cannot know what copy jobs are processed or stored in the digital copier. Likewise, the digital copier cannot know information as to what print jobs are spooled in the print server.

Therefore, to know how many print jobs and copy jobs wait for print processing in the digital copier, the user must see UI displays of both the print server and the digital copier. In FIG. 25, the digital copier 10 is connected directly to the print server 20 by a cable, or the like, it is also possible that the digital copier 10 and the print server 20 are connected remotely via a network. If such a configuration is adopted, the user cannot see the UI displays of both the digital copier 10 and the print server 20 at remote locations at a time.

SUMMARY OF THE INVENTION

It is therefore an object of the present invention to provide a mechanism for the user to see the state of print and copy jobs at a time in a print system comprising an image forming device, such as a digital copier, and a print control device, such as a print server.

In order to achieve the above object, according to the present invention, a print system is provided with job information integration means for integrating the copy job management information contained in an image forming device and the print job management information contained in a print control device into integrated job management information of the copy and print jobs printed by the image forming device, and job information display means for listing the copy job and print job management information on a display based on the integrated job management information provided by the job information integration means.

In the configuration, the image forming device manages the copy job management information and the print control device manages the print job management information. The job information integration means integrates the separately managed information into integrated job management information containing both the copy job management information and the print job management information. The job information display means lists the copy job and print job management information on the display based on the integrated job management information. The user can see the listing provided by the job information display means to know at a time the current state of the copy jobs managed by the image forming device and the print jobs managed by the print control device.

The job information integration means and the job information display means may be placed in only either of or each of the print control device and the image forming device. A computer comprising the functions of the job information integration means and the job information display means may be provided aside from the print control device or the image forming device and connected to the print control device and the image forming device via a network, or the like.

BRIEF DESCRIPTION OF THE DRAWINGS

In the accompanying drawings:

FIG. 2 is a block diagram to show the detailed configuration of a control section in a digital copier;

FIG. 3 is an illustration to show an example of copy job management information;

FIG. 7 is an illustration to show an example of integrated job management information;

FIG. 16 is an illustration to show another example of a job state listing;

FIG. 16 is an illustration to show another example of a job state listing;

FIGS. 17(a) to (c) are illustrations to describe a job suspension state;

FIGS. 19(a) to (d) are illustrations to describe a move procedure of the job processing order;

FIGS. 20(a) to (d) are illustrations to describe mode change processing associated with a move of the job processing order;

There will be described below preferred embodiments of the present invention with reference to the accompanying drawings.

1. General Configuration

Figure 1:
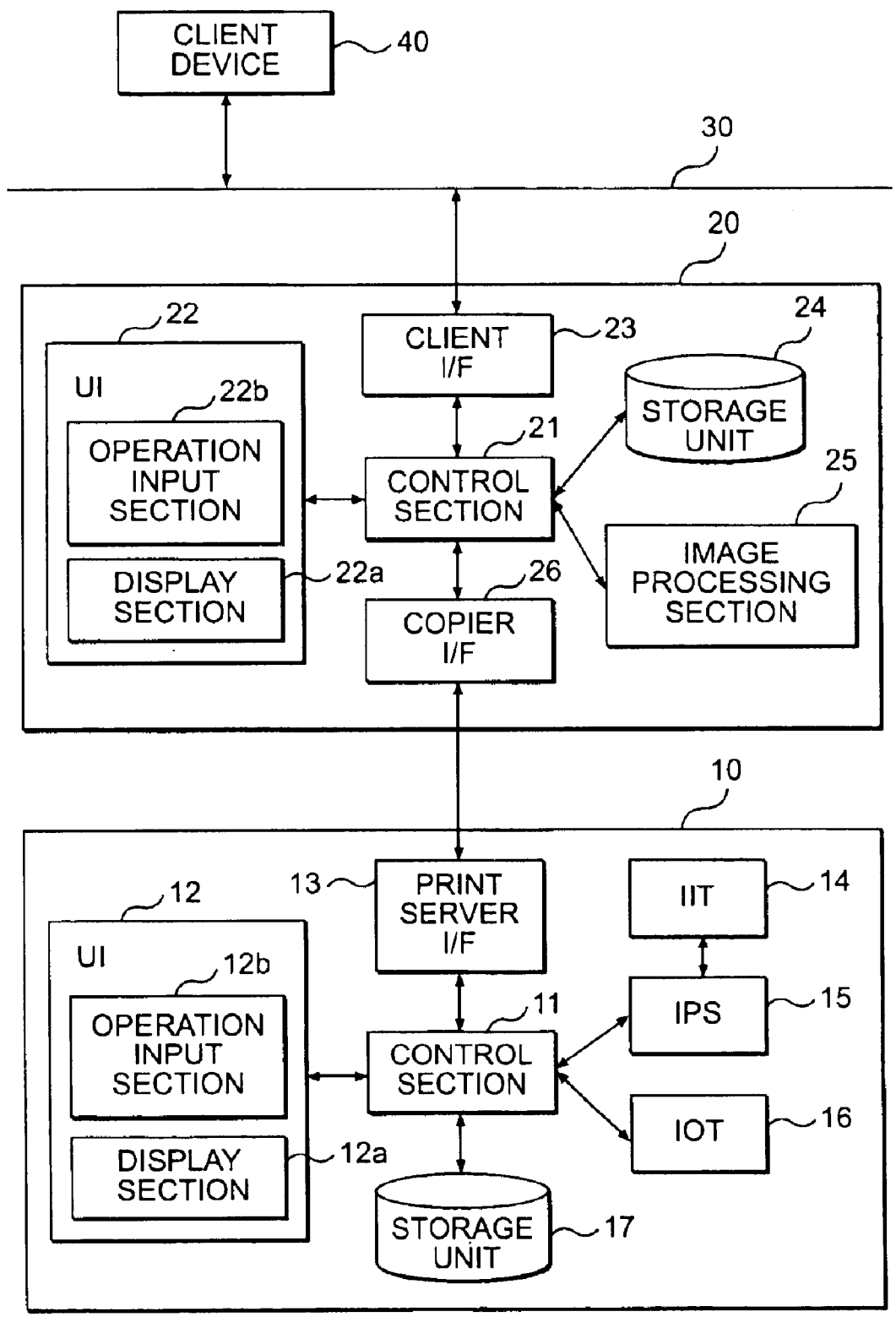
FIG. 1 is a block diagram to show the whole configuration of a print system of one embodiment according to the present invention.

FIG. 1 is a functional block diagram to show the whole configuration of a print system according to the present invention. In the figure, the print system is made up of a digital copier 10 and a print server 20. The digital copier 10 functions not only as a copier, but also as a printer for printing a print job output from a client device 40. The digital copier 10 and the print server 20 will be discussed in detail.

The digital copier 10 comprises a control section 11, an UI (user interface) 12, a print server I/F (interface) 18, an IIT (image input terminal) 14, an IPS (image processing system) 15, an IOT (image output terminal) 16, and a storage unit 17. The control section 11 is a module for controlling the whole digital copier 10. The UI 12 is an user interface for the user to enter operation commands, or the like, for the digital copier 10 and contains a display section 12a and an operation input section 12b. The display section 12a can be a liquid crystal display, for example. The operation input section 12b can be made up of operation buttons. The display section 12a and the operation input section 12b can also be formed in one piece as a so-called touch panel. The print server I/F 13 is an interface module for communicating with the print server 20. The IIT 14 is a mechanism for optically reading an original to be copied. The IPS 15 is a module for performing processing of color correction, data compression, or the like, for the original image data provided by the IIT 14. The image data compressed by the IPS 15 is stored in the storage unit 17 under the control of the control section 11. At the printing time, the control section 11 reads the compressed image data from the storage unit 17 and the IPS 15 expands the image data, then supplies the image data to the IOT 16, which then prints the received image data on paper. It is preferable that the storage unit 17 has a large capacity because it needs to store a large number of original data pieces (the data size cannot be ignored although the data is compressed). Considering costs, for example, a hard disk drive is preferred as the storage unit 17.

The digital copier 10 once stores the images of the pages of the image read by the IIT 14 in the storage unit 17 and reads and supplies the images from the storage unit 17 to the IOT 16 (namely, causes the IOT 16 to print the images). According to the configuration of the digital copier 10, reading processing by the IIT 14 and print processing by the IOT 16 can be executed independently.

Further, the digital copier 10 can retain and manage a number of copy jobs. That is, it recognizes pages input to the IIT 14 in batch through an ADF (auto document feeder), or the like, as one copy job and manages image data groups in job units. The control section 11 manages the correspondence between the images stored in the storage unit 17 and copy jobs. It also manages copy attributes (paper size, the number of copies, scaling factor, or the like,) entered through the operation input section 12b when the copy jobs are input in correspondence with the copy jobs. The job management of the control section 11 basically is FIFO (first-in first-out). That is, the control section 11 enters input copy jobs in a queue in order, then takes out a copy job in order from the top of the queue and causes the IOT 16 to print.

The digital copier 10 can receive a print job from the client device 40 via the print server 20 and print the print job by the IOT 16. As the digital copier 10 thus processes print jobs, it requires print processing contention control between copy and print jobs.

That is, print job input from the client device 40 and copy job input in the digital copier 10 are executed at arbitrary timings. Upon reception of a print job, immediately the print server 20 attempts to cause the digital copier 10 to print the print job. Thus, a print job and a copy job may arrive at the digital copier 10 almost at the same time. In such a case, it is necessary to determine which of the copy and print jobs is to be processed first.

More than one mode or such contention control is defined in the digital copier 10. The contention control is executed by the control section 11. The topic of the contention is described later in detail.

The print server 20 comprises a control section 21, an UI 22, a client I/F 23, a storage unit 24, an image processing section 25, and a copier I/F 26. The control section 21 is a module for controlling the whole print server 20. The UI 22 is an user interface for the user to enter operation commands, or the like, for the print server 20 and contains a display section 22a and an operation input section 22b. For example, the display section 22a can be a liquid crystal display or a CRT, and the operation input section 22b can be a general-purpose keyboard, a dedicated operation panel, or the like. The client IF 23 is an interface module for communication via a network 80. A print job output from the client device 40 is input via the network 30 to the print server 20 through the client I/F 23. Print jobs issued by the client device 40 may be raster images or PDL (page description language) data such as PostScript (trademark of Adobe Systems USA) data or PDF/TIFF (trademark of Adobe Systems USA) data. If the print job is PDL data, the IOT 16 of the digital copier 10 cannot print it with no change. Then, the image processing section 25 interprets the print job described in the PDL and converts it into the format of image data that can be processed by the IOT 16 of the digital copier 10. The term "image data" in this specification is used to mean data in the data format that can be processed by the IOT 16 of the digital copier 10. The image data thus prepared is stored in the storage unit 24 and waits its print processing turn.

The image processing section 25 also has a function of compressing image data. If a print job contains a compressed retention instruction, the image data forming the print job is compressed by the image processing section 25, then stored in the storage unit 24. When the image data retained under compression is transmitted to the digital copier 10, it is expanded to the original image data by the image processing section 25.

An instruction concerning the print contents in addition to data representing images to be printed may be sent from the client device 40 to the print server 20. Such an instruction may be contained in the PDL description or may be sent as separate data from the PDL confirming to the protocol defined between the client device 40 and the print server 20. The print server 20 convert the print instruction contents into the format that can be understood by the digital copier 10 and stores the print instruction data in the storage unit 24 in correspondence with the image data. When the print turn comes, the stored print instruction data together with its corresponding image data is sent to the digital copier 10, which then supplies the received print instruction data and image data to the IOT 16 in sequence and causes the IOT 16 to print.

The print instruction sent from the client device 40 contains a print mode instruction and attribute information of data to be printed. The print mode instruction contains output paper size and type, paper feed tray and paper discharge tray specification, scaling specification, and post-processing specification (the number and positions of staples, specification as to whether or not binding is executed, and so on), for example. The postprocessing specification is possible only if the digital copier 10 has a postprocessing function (stapling, punching, or the like,). The data attribute information contains the size and type of data to be printed, color attribute (color or monochrome), the owner name of the data, or the like, for example.

It is preferable that the storage unit 24 has a large capacity because it needs to once store data of print jobs received from the client device 40 and store the image data prepared from the print jobs. For example, a hard disk drive can be used as the storage unit 24. The copier I/F 26 is an interface module for communicating with the digital copier 10. The digital copier 10 and the print server 20 are connected via the print server I/F 13 and the copier I/F 26.

When receiving a print job described in a print description language from the client device 40, the print server 20 develops the print job into image data by the image processing section 26 and stores the image data in the storage unit 24 under the control of the control section 21. The control section 21 manages the image data stored in the storage unit 24 in correspondence with the identifier of the print job (job name, or the like,). Then, it schedules the print jobs with respect to the print order basically, the input order) and outputs the image data of the print jobs to the digital copier 10 according to the print order. That is, the control section 21 enters the input print jobs in a queue in order, then takes out a print job in order from the top of the queue and supplies the print job to the digital copier 10. The print server 20 has a function of changing the order of the print jobs in the queue in response to a user's instruction. This function is described later in detail.

2. Basic Job Management

Next, the control section 11 of the digital copier 10 and the control section 21 of the print server 20 will be discussed in detail FIG. 2 is a functional block diagram to show the detailed configuration of the control section 11 of the digital copier 10. As shown here, the control section 11 comprises a copy job management section 110, a mode management section 114, an image output control section 116, and an integrated job management section 100. The copy job management section 110 is a module for managing copy jobs. When a copy job is input from the IIT 14, the copy job management section 110 assigns an identifier to the copy job and manages the image data of pages of the copy job in correspondence with the identifier. Here, this identifier is called a job name. The copy job management section 110 prepares predetermined management information (namely, copy job management information 112) for the managed copy jobs.

FIG. 3 is an illustration to show an example of the contents of the copy job management information 112. As shown here, job name, status, owner, size, the number of pages, and the number of copies are registered for each copy job as the copy job management information 112. For example, the "status" is information indicating the current state of the job, namely, indicating that the job is being printed, that the job will be printed in what order, or the like. In the example, the status "wait" indicates that the job ("copy23") is in a print processing wait state. If the processing order is registered in the status, the job is printed in accordance with the processing order indicated in the status. The "owner" denotes the identifier of the owner of the job. For copy jobs, owner information can be provided from an ID card reader for copier charge management, for example. The "size" denotes the size of the image data of the job in byte units, the "number of pages" denotes the number of pages of the document of the job, and the "number of copiers" denotes the number of print copies of the document of the job.

Referring again to FIG. 2, the mode management section 114 is a module for managing the mode concerning contention control between print and copy jobs. It accepts mode setting from the user or system administrator and stores the setup mode value. The mode setup value may be stored in main memory of the digital copier 10 or in a nonvolatile, large-capacity storage unit, such as a hard disk drive, attached to the digital copier 10. In the latter case, the mode setup value can be retained if power of the digital copier 10 is turned on and off. In the embodiment, five modes of copy job priority mode, print job priority mode, and so on, are defied as the contention control mode. The mode contents and contention control are described later in detail.

The image output control section 116 performs contention control between print and copy jobs in response to the mode set in the mode management section 114. That is, it selects either the copy job at the top of the queue in the copy job management section 110 or a print job input from the print server 20 and supplies the image data of the selected job to the IOT 16.

Figures 4, 5:
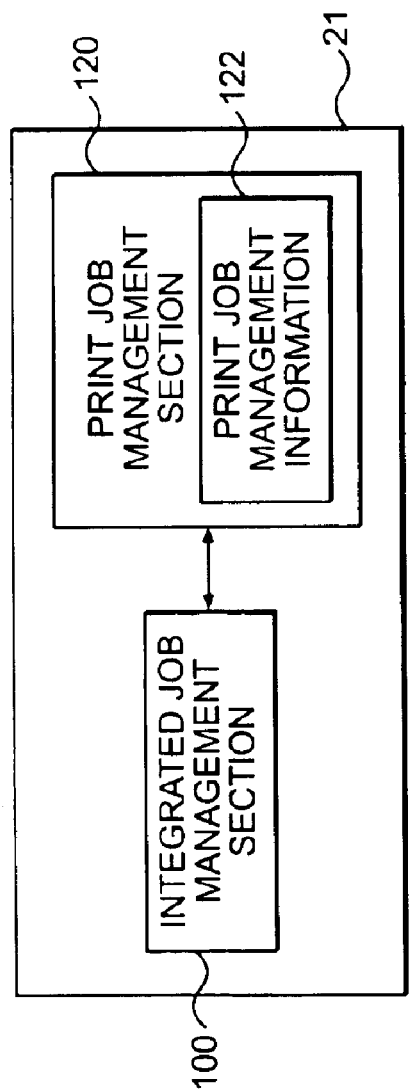
FIG. 4 is a block diagram to show the detailed configuration of a control section in a print server.
FIG. 5 is an illustration to show an example of print job management information.

The integrated job management section 100, which is one feature of the embodiment, is means for executing integrated job management for all the current jobs retained by the print system (namely, the digital copier 10 and the print server 20). The integrated job management section 100 is described later in detail FIG. 4 is a functional block diagram to show the detailed configuration of the control section 21 of the print server 20. As shown here, the control section 21 has a print job management section 120 and an integrated job management section 100. The print job management section 120 is a module for managing print jobs. That is, when a print job is input via the client I/F 23, the print job management section 120 passes the print job to the image processing section 25 and stores the image data prepared by the image processing section 25 in the storage unit 24. The print job management section 120 manages the image data stored in the storage unit 24 in correspondence with the job name of the print job. It also prepares management information (namely, print job management information 122) for each of the managed print jobs.

FIG. 5 is an illustration to show an example of the contents of the print job management information 122. In this example, job name, status, owner, size, the number of pages, and the number of copies are registered for each print job in the print job management information 122 like the above-described copy job management information (see FIG. 8). The contents of the items are similar to those of the copy job management information. The "Status" value "print" indicates that the job is being printed on the digital copier, and "let" and "2nd" indicate that the jobs are the first job and the second job of print jobs waiting for print. The processing order value in the status of the print job management information 122 only indicates the order among the print jobs. Likewise, the processing order value in the status of the copy job management information 112 (although not shown in FIG. 3) only indicates the order among the copy jobs. How the processing order values are reflected on the actual print-out order on the digital copier 10 varies depending on the mode of the digital copier 10.

Like the control section 11 of the digital copier 10, the control section 21 has an integrated job management section 100 for providing integrated job management for all the current jobs retained by the print system. This integrated job management section 100 basically may be the same as that installed in the control section 11.

3. Integrated Job Management Section

Figure 6:
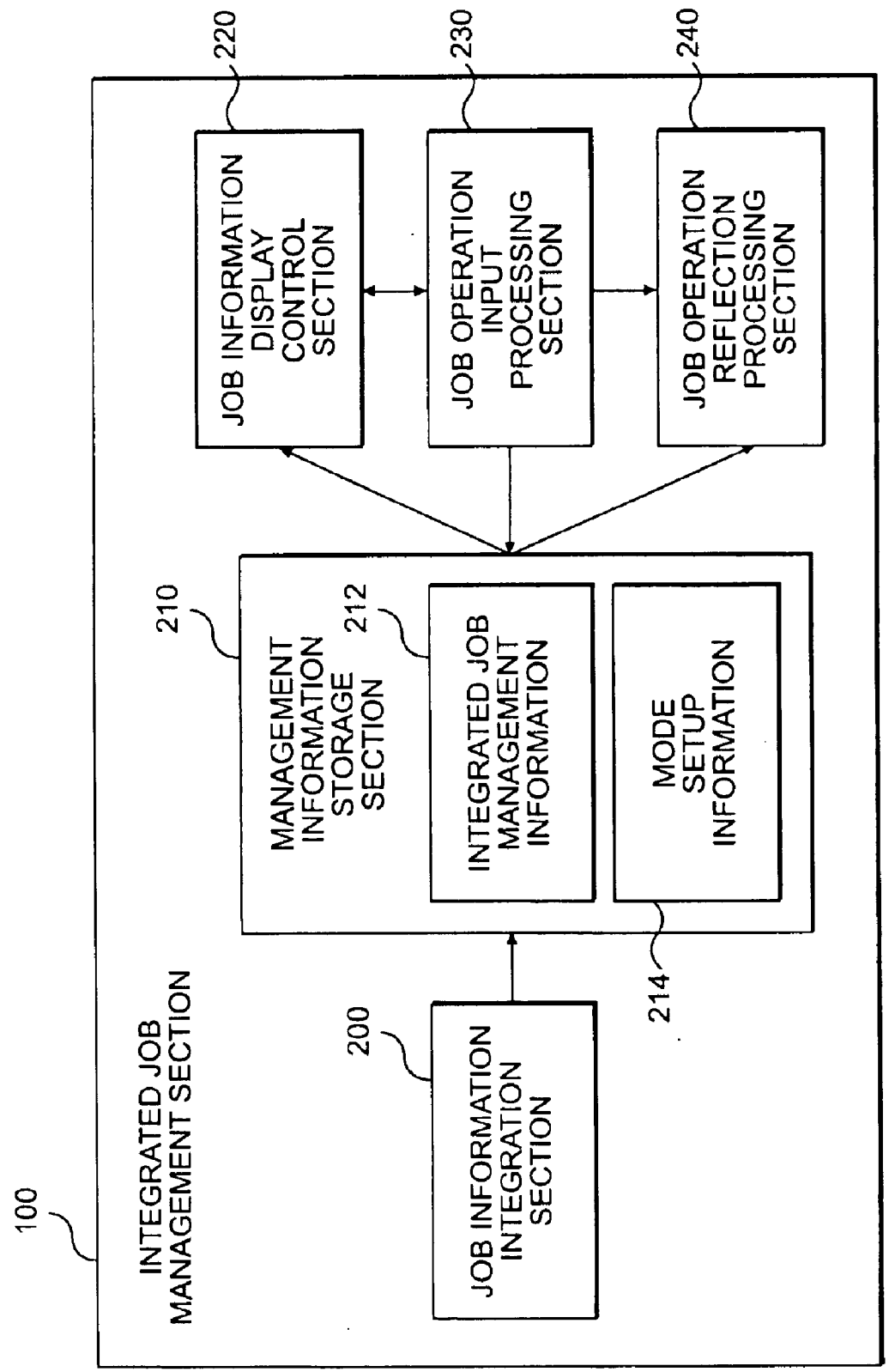
FIG. 6 is a block diagram to show the detailed configuration of an integrated job management section.

Next, the configuration and processing contents of the integrated job management section 100 installed in each of the control sections 11 and 21 will be discussed with reference to FIG. 6. As shown in the figure, the integrated job management section 100 comprises a job information integration section 200, a management information storage section 210, a job information display control section 220, a job operation input processing section 230, and a job operation reflection processing section 240. The job information integration section 200 obtains the copy job management information 112 and the print job management information 122 from the copy job management section 110 of the digital copier 10 and the print job management section 120 of the print server 20 and integrates the information into integrated job management information 212. This integrated job management information 212 is stored in the management information storage section 210. The job information integration section 200 also obtains the setup value of the contention control mode from the mode management section 114 of the digital copier 10. The obtained mode setup value is stored in the management information storage section 210 as mode setup information 214. The job information integration section 200 executes the management information integration processing when the digital copier 10 is started or when the print server 20 is started. Then, the management information integration processing is executed periodically or whenever an event occurs. The events as a trigger of the management information integration processing include completion of job processing of the digital copier 10 (and processing start of a new job accompanying the job processing completion), entry of an job operation command by the user (and update of integrated job management information accompanying the job operation command entry), or the like.

FIG. 7 is an illustration to show an example of the contents of the integrated job management information 212. As shown here, both print job management information and copy job management information are integrated into the integrated job management information 212. In addition to the information managed by the copy job management section 110 and the print job management section 120, job type (namely, either copy job or print job) information is registered for each job in the integrated job management information 212. The status in the integrated job management information 212 is not identical with the "status" registered in the copy job management section 110 or the print job management section 120 and list the values representing the processing order of all jobs of the print jobs plus the copy jobs. Thus, the job information integration section 200 determines the processing order of all jobs based on the "status" registered in the copy job management section 110 and the print job management section 120 and the mode of the digital copier 10, and registers the determined processing order in the integrated job management information 212.

Figure 8:
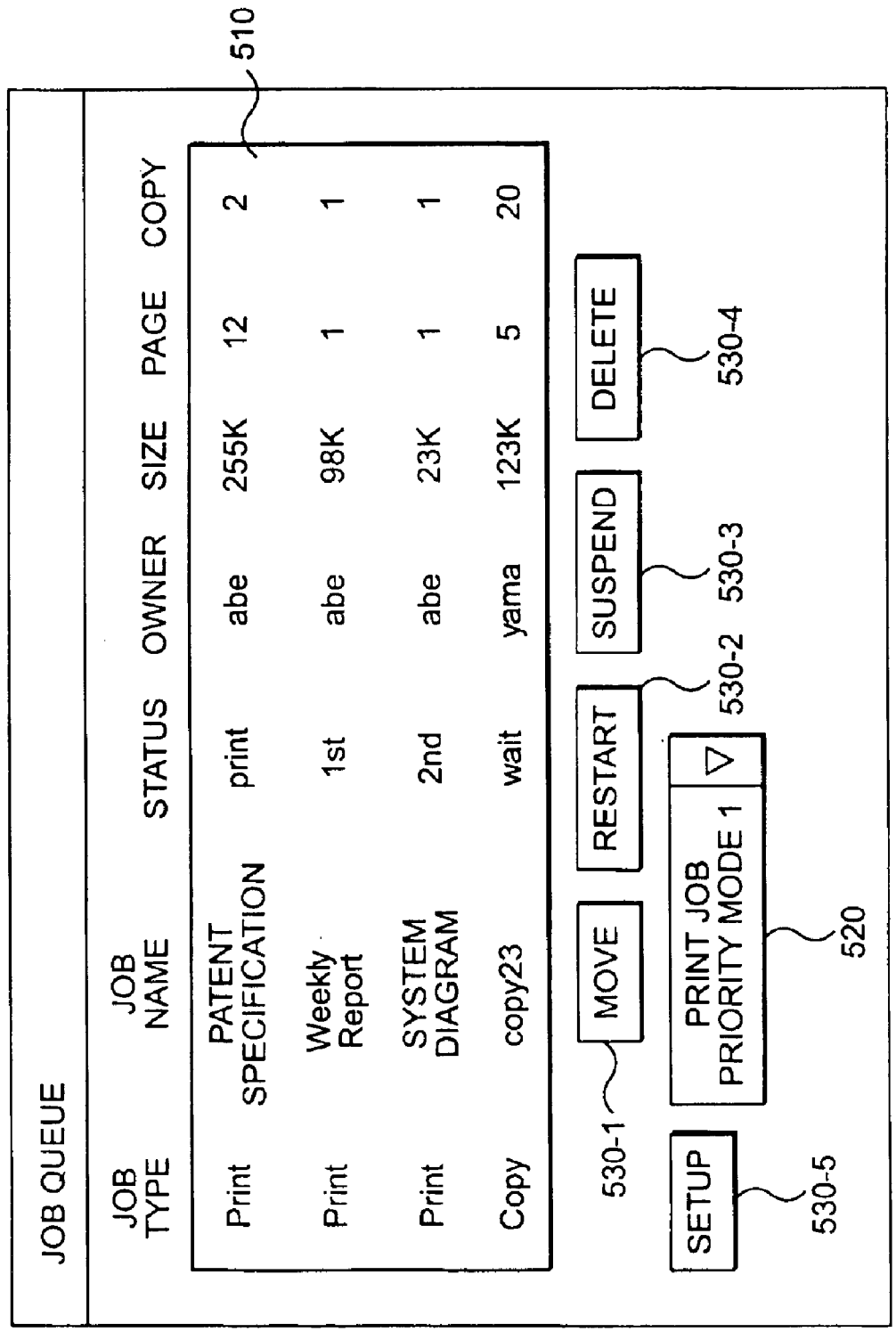
FIG. 8 is an illustration to show an example of a job state listing provided by a job information display control section.

The job information display control section 220 controls display processing of the integrated job management information 212 and the mode setup information 214. The display information prepared by the job information display control section 220 is displayed on the display section 22a of the print server 20 (or the display section 12a of the digital copier 10). FIG. 8 is an illustration to show a display example of integrated job management information on the display section 22a. This example is a display example using a window system. In FIG. 8, a display window 500 is provided with an integrated job management information display area 510 and a mode setup information display area 520. The integrated job management information display area 510 consists of columns of type, job name, status, owner, size, page (number of pages), and copy (number of copies) for listing the job management information for each job based on the integrated job management information shown in FIG. 7. The job types are listed under the column type, so that the user can know what jobs exist in the print system at present. The display window 500 also contains operation buttons 530 for job operation, or the like, described later. The integrated job management information 212 and the mode setup information 214 are thus displayed, so that the user can check at a time the copy and print jobs being processed (namely, printed) and to be processed by the print system.

The job operation input processing section 230 is a module for accepting user's operation for the jobs registered in the integrated job management information 212. The operation is operation in job units, such as job deletion, suspension, restart, and processing order change. The job operation input processing section 230 obtains in job operation command entered through the operation input section 22b of the print server 20 (or the operation input section 12b of the digital copier 10). With the window display as shown in FIG. 8, the user can click on a desired operation button 530 to specify the operation contents. In this case, the user can specify the job to be operated by clicking on the desired job in the display area 510. For example, to delete the print job "system diagram," the user should click on the "system diagram" row in the display area 510 and then click on a delete button 530-4. A move button 530-1 is a button for specifying a move of the processing order of a job. If the user clicks on one job for selection and clicks on the move button 530-1 and the move destination, the processing order of the job changes to that of the destination. A suspend button 530-8 is a button for specifying suspension of job processing. If the user selects a job and clicks on the suspend button 530-8, processing of the selected job is suspended.

In this case, the status of the job is changed to a value indicating the suspension state (for example, "suspend"). The job suspension state refers to a state in which the job is queued in a state in which it can be printed (or copied) at any time and another subsequent job is processed first. If the user elects the suspended job and clicks on a restart button 530-2, processing of the job is restarted.

The job operation input processing section 230 changes the integrated job management information (particularly, the status) in accordance with the user's operation command obtained through the operation input section 22b (or 12b). For example, if the operation command is to delete one job, the job operation input processing section 230 deletes the job from the integrated job management information and adjusts the status of other jobs. It also sends the operation command to the job operation reflection processing section 240.

The job operation reflection processing section 240 performs processing of reflecting the contents of the operation command on the copy job management information 112 in the copy job management section 110 and the print job management information 122 in the print job management section 120. For example, if the operation command is to delete one print job, the job operation reflection processing section 240 instructs the print job management section 120 to delete the job. Resultantly, the print job is discarded and the print job management information 122 is updated. Likewise, if a copy job operation command is entered, the operation command is sent to the copy job management section 110. If an operation command for both print and copy jobs is entered, the operation command is sent to both the print job management section 120 and the copy job management section 110. Thus, the operation command entered by the user seeing the listing of the integrated job management information (see FIG. 8) is reflected on the print job management section 120 and the copy job management section 110.

Thus, in the embodiment, the job operation input processing section 230 and the job operation reflection processing section 240 are provided, so that the user can enter a job operation command in association with the listing of the integrated job management information and reflect the command contents on the digital copier 10 and the print server 20.

4. Contention Control Mode

Next, the contention control mode between copy and print jobs will be discussed. The print system of the embodiment defines five modes, which are described below one by one.

(1) First Copy Job Priority Mode

Figure 9:
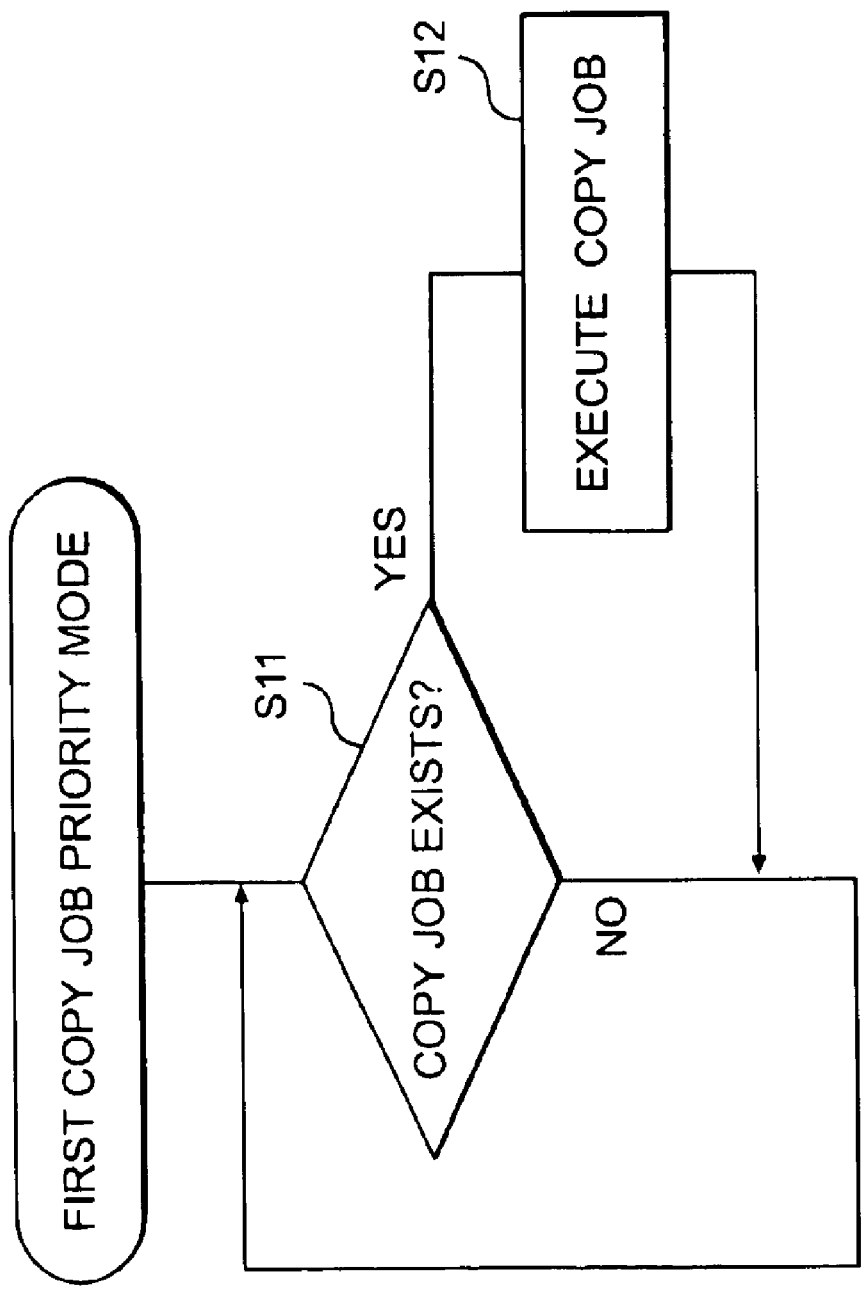
FIG. 9 is a flowchart to show a job contention control flow in a first copy job priority mode.

This first copy job priority mode is a mode in which a copy job always takes precedence in processing. In the mode, print jobs are not processed. In this case, the print jobs are held in the print server 20 and entered into a wait state (status "wait"). That is, in the mode, as shown in FIG. 9, whether or not a copy job exists is determined at step S11 and if a copy job exists, print-processing of the copy job is performed at step S12; if no copy job exists, print processing is not performed.

(2) Second Copy Job Priority Mode

Figure 10:
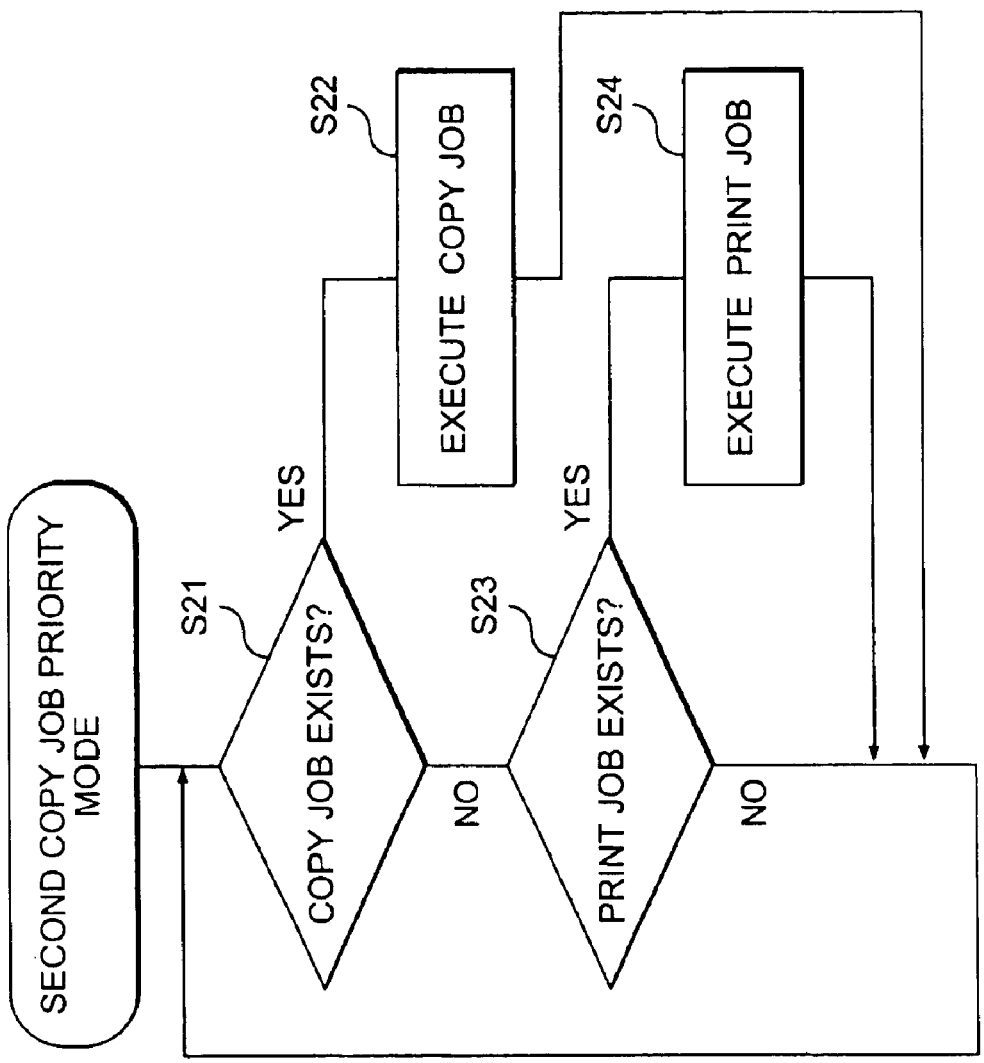
FIG. 10 is a flowchart to show a job contention control flow in a second copy job priority mode.

This second copy job priority mode is a mode in which a copy job takes precedence only if copy and print jobs contend with each other. Therefore, when the digital copier 10 does not have any copy jobs, print processing of a print job is performed. In the mode, if a copy job is input while the digital copier 10 performs print processing of a print job, the copy job is not processed until the print job processing is complete. That is, in the mode, as shown in FIG. 10, whether or not a copy job exists is determined at step S21 and if a copy job exists, processing of the copy job is executed at step S22. Whether or not a print job exists is determined at step S23 only if no copy job exists. If a print job exists, processing of the print job is performed.

(3) First Print Job Priority Mode

Figure 11:
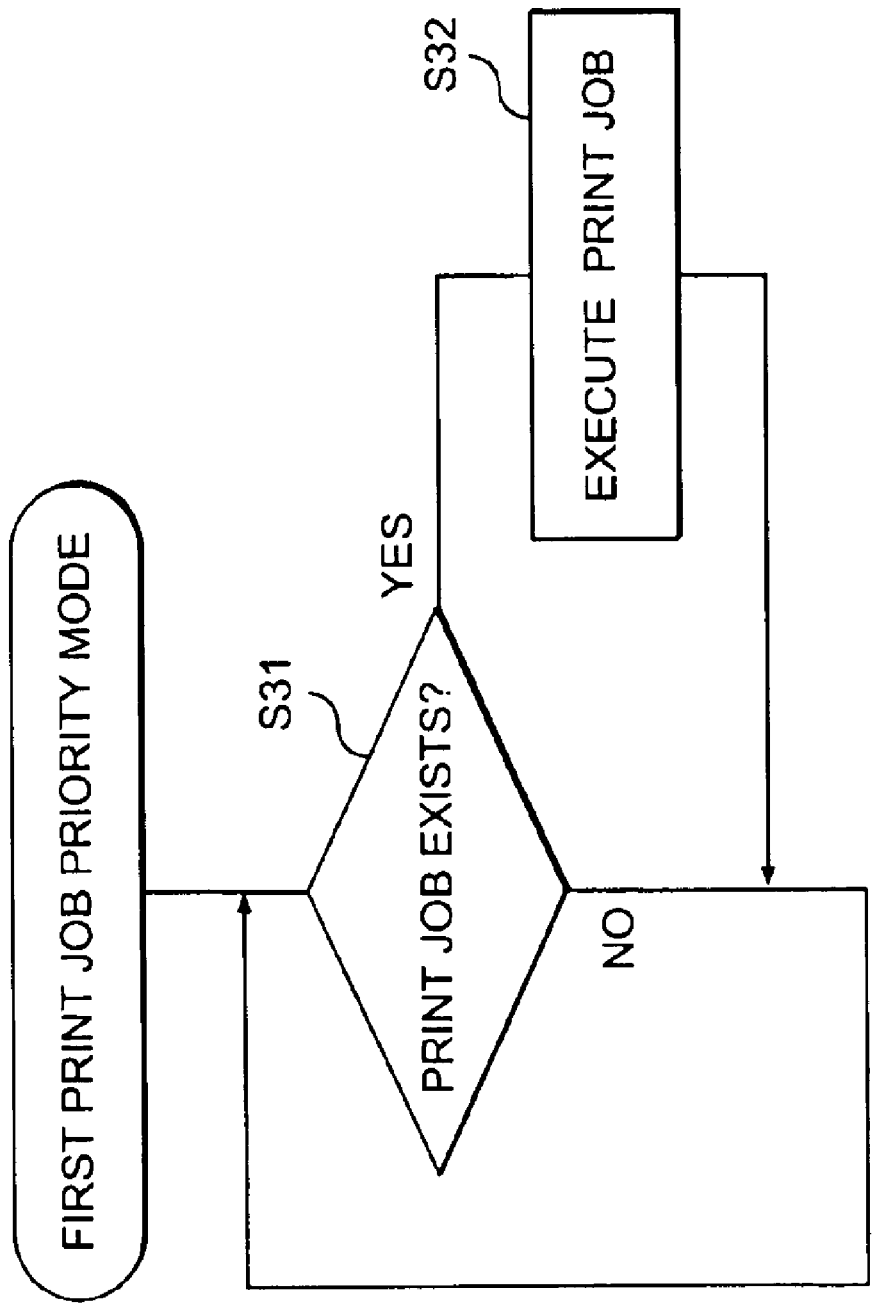
FIG. 11 is a flow chart to show a job contention control flow in a first print job priority mode.

This first print job priority mode is a mode in which a print job always takes precedence in processing. In the mode, copy jobs are not processed. In this case, the copy jobs are held in the digital copier 10 and entered into a wait state. That is, in the mode, as shown in FIG. 11, whether or not a print job exists is determined at step S81 and if a print job exists, print processing of the print job is performed at step S82; if no print job exists, print processing is not performed.

(4) Second Print Job Priority Mode

Figure 12:
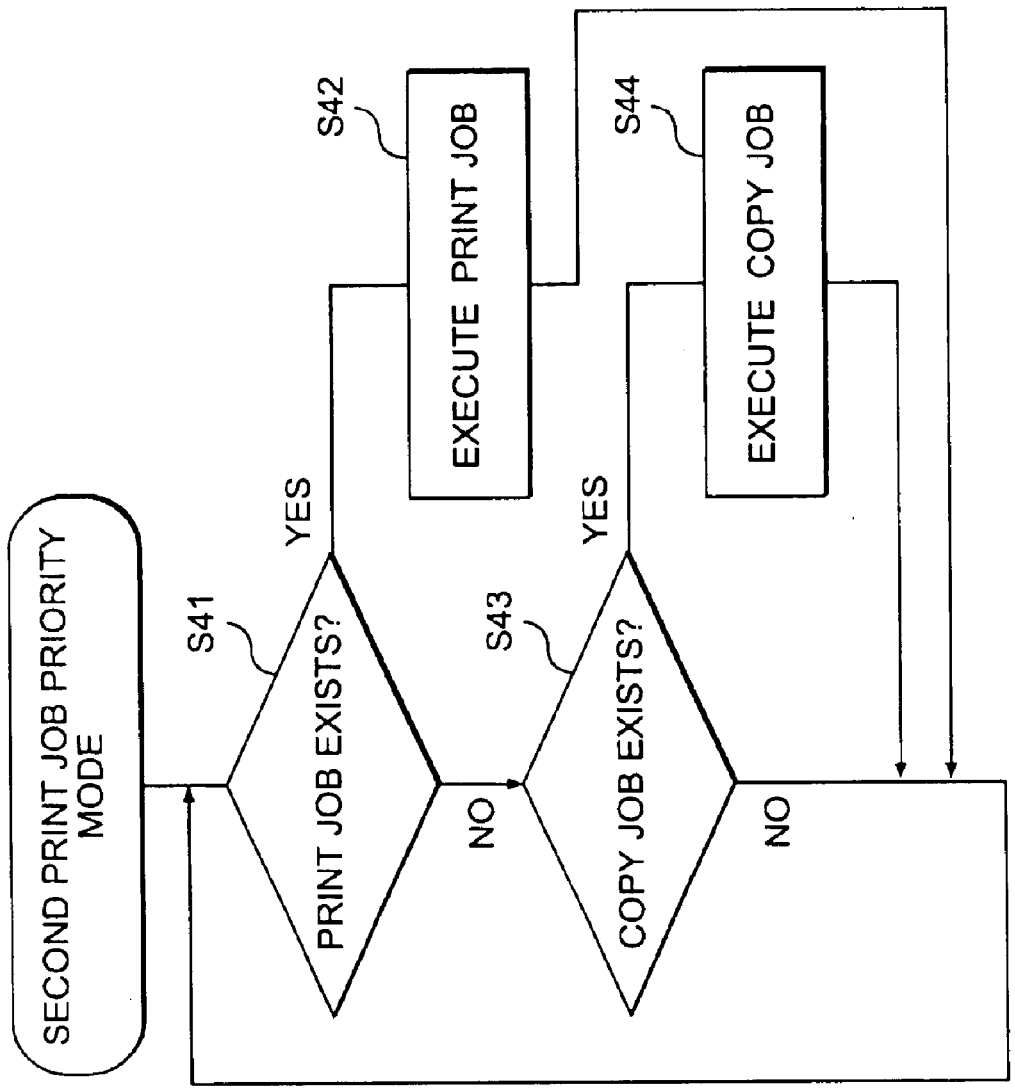
FIG. 12 is a flowchart to show a job contention control flow in a second print job priority mode.

This second print job priority mode is a mode in which a print job takes precedence only if copy and print jobs contend with each other. Therefore, when all print jobs have been processed, processing of a copy job is performed. In the mode, if a print job is input while the digital copier 10 performs print processing of a copy job, the print job is not processed until the copy job processing is complete. That is, in the mode, as shown in FIG. 12, whether or not a print job exists is determined at step S41 and if a print job exists, processing of the print job is executed at step S42. Whether or not a copy job exists is determined at step S43 only if no print job exists. If a print job exists, processing of the print job is performed.

(5) Non-Priority Mode

This non-priority mode handles copy and print jobs equally. That is, the copy and print jobs are processed in the acceptance order.

Figure 13:
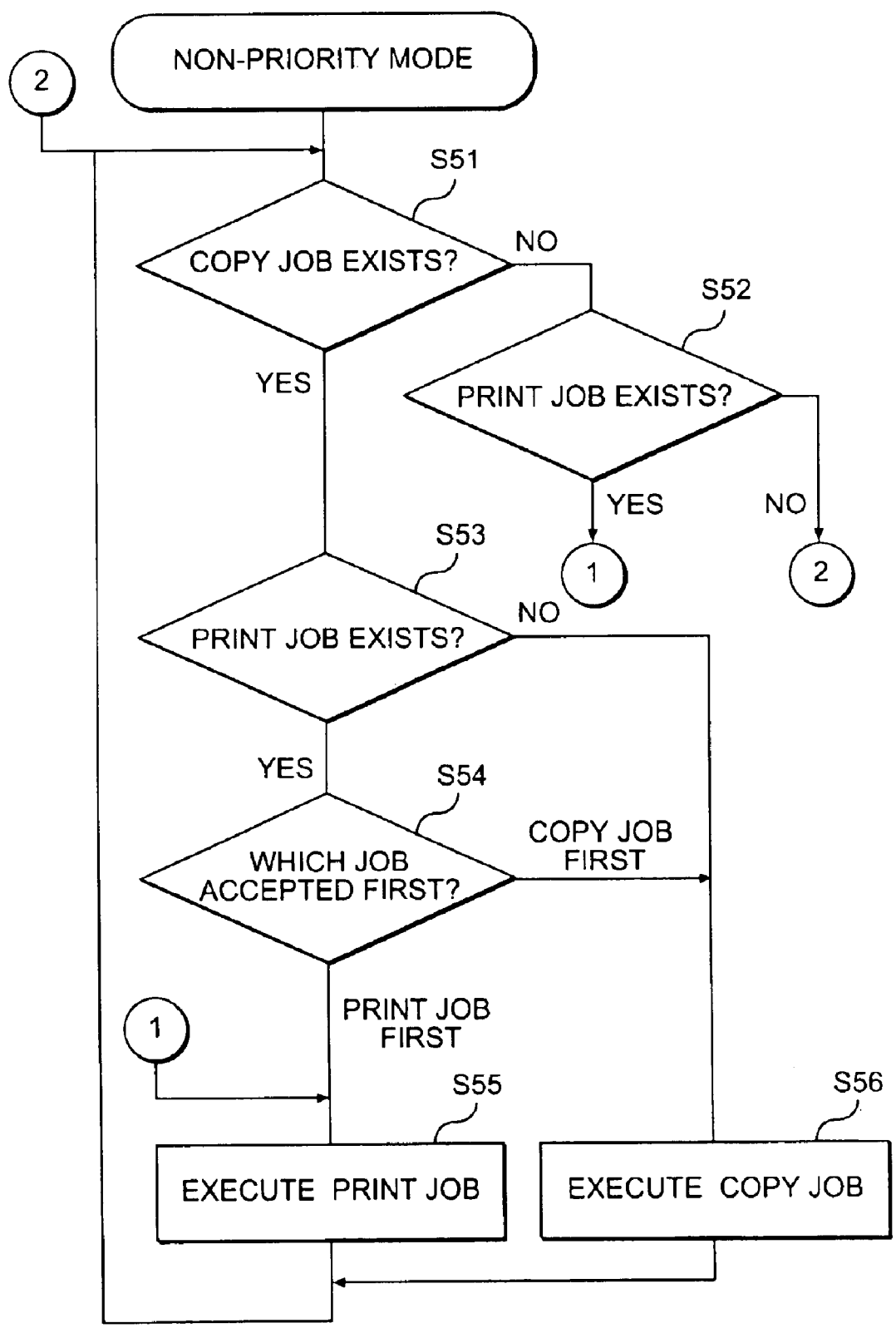
FIG. 13 is a flowchart to show a job contention control flow in non-priority mode.

In the mode, for example, as shown in FIG. 13, whether or not a copy job exists is determined at step S51. If no copy job exists, whether or not a print job exists is determined at step S52 and if a print job exit, processing of the print job is executed at step S56. If a copy job exists at step S51, further whether or not a print job exists is determined at step S53. If no print job exists, it means that only a copy job exists. Then, processing of the copy job is executed at step S56. If a print job exists at step S53, it means that both print and copy jobs exist. In this case, whether the first job accepted by the print system is the copy or print job is determined at step S54. If it is determined that the print job is first accepted, processing of the print job is executed at step S55; if it is determined that the copy job is it accepted, processing of the copy job is executed at step S56. To provide the non-priority mode, the print system manages the job reception time as job management information.

The contention control modes defined in the embodiment have been described. The modes are managed by the mode management section 114 of the digital copier 10. The processing order of copy and print jobs varies depending on which mode is selected. That is, the copy job management section 110 manages the processing order of copy jobs and the print job management section 120 manages the processing order of print jobs, but the processing order of the whole jobs of the copy jobs plus the print jobs is not determined until the mode is determined. Then, when integrating print job management information and copy job management information, the integrated job management section 100 references the mode setup value and determines the processing order status for each job. For example, when the print system is in the first print job priority mode, copy jobs are not processed, thus the status of each copy job is determined "wait." When the print system is in the non-priority mode, the integrated job management section 100 determines the processing order of the jobs based on the reception time. The processing order status among the whole jobs is thus determined and listed, so that the user can know what order the current jobs held in the print system will be processed in.

The mode can be changed by the user who enters a command on a listing provided by the integrated job management section 100 (see FIG. 8), for example. That is, the user can change the mode by selecting any desired mode out of a pull-down menu attached to the mode display area 520 and clicking on a set button 530-6. The mode change command is sent through the job operation reflection processing section 240 to the mode management section 114 of the digital copier 10 and the mode setup value held in the mode management section 114 is changed to the setup value of the selected mode.

The following methods are possible for dynamically control the mode:

In the first method, the mode default value is predetermined and if neither a print job nor a copy job is input for a predetermined time, the mode is restored to the default value.

In the second method, the integrated job management section 100 monitors change in integrating print job management information and if it detects one job remaining in a processing wait state for a predetermined time or more in a state in which the same mode continues, the integrated job management section 100 changes the mode setting so as to print the job. If the mode for processing jobs only of one type continues for hours, the method makes it possible to process a job of the other type placed in a processing wait state meanwhile.

5. Display Examples of Integrated Job Management Information

Figure 14:
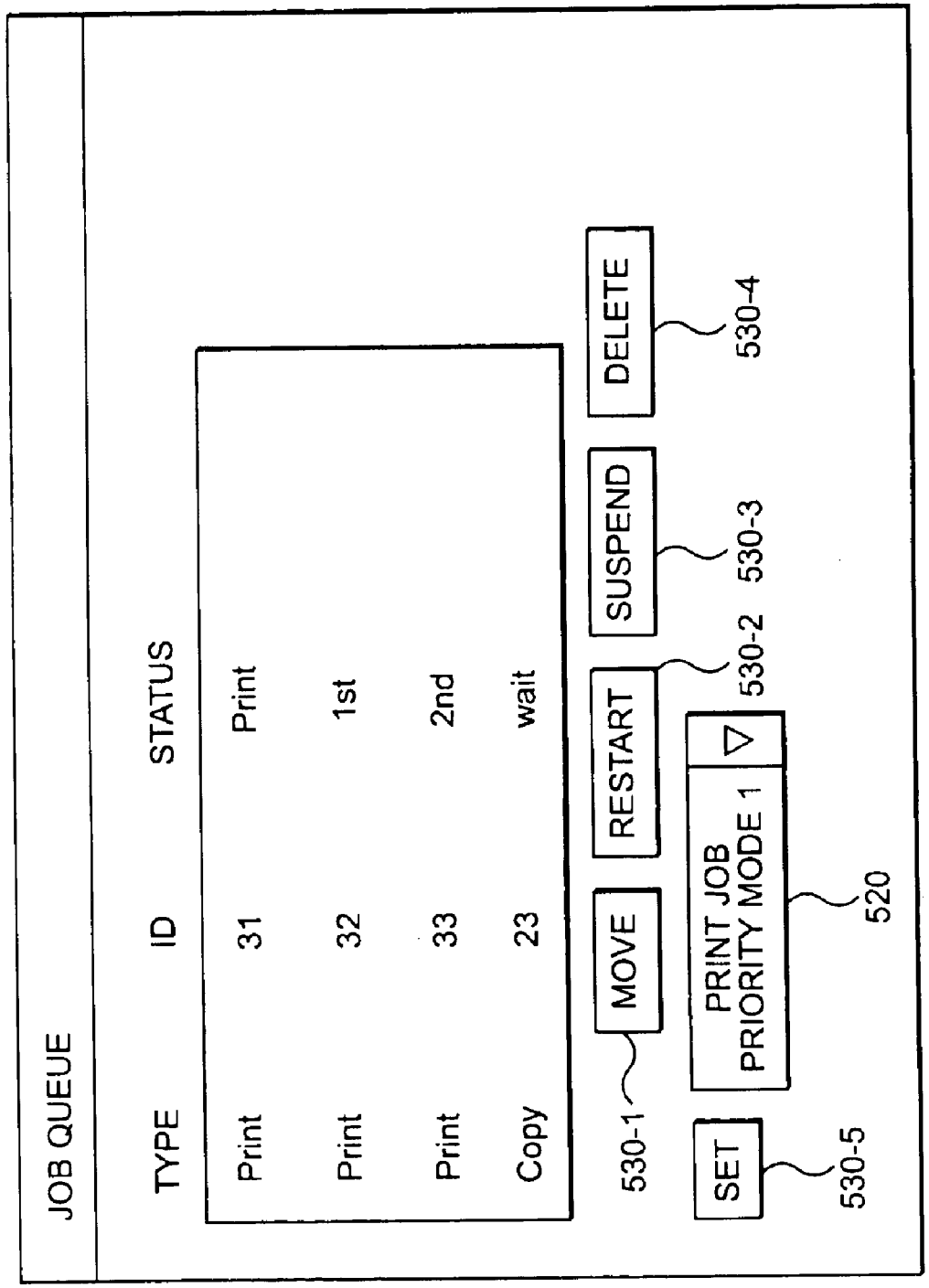
FIG. 14 is an illustration to show another example of a job state listing.
Figure 15:
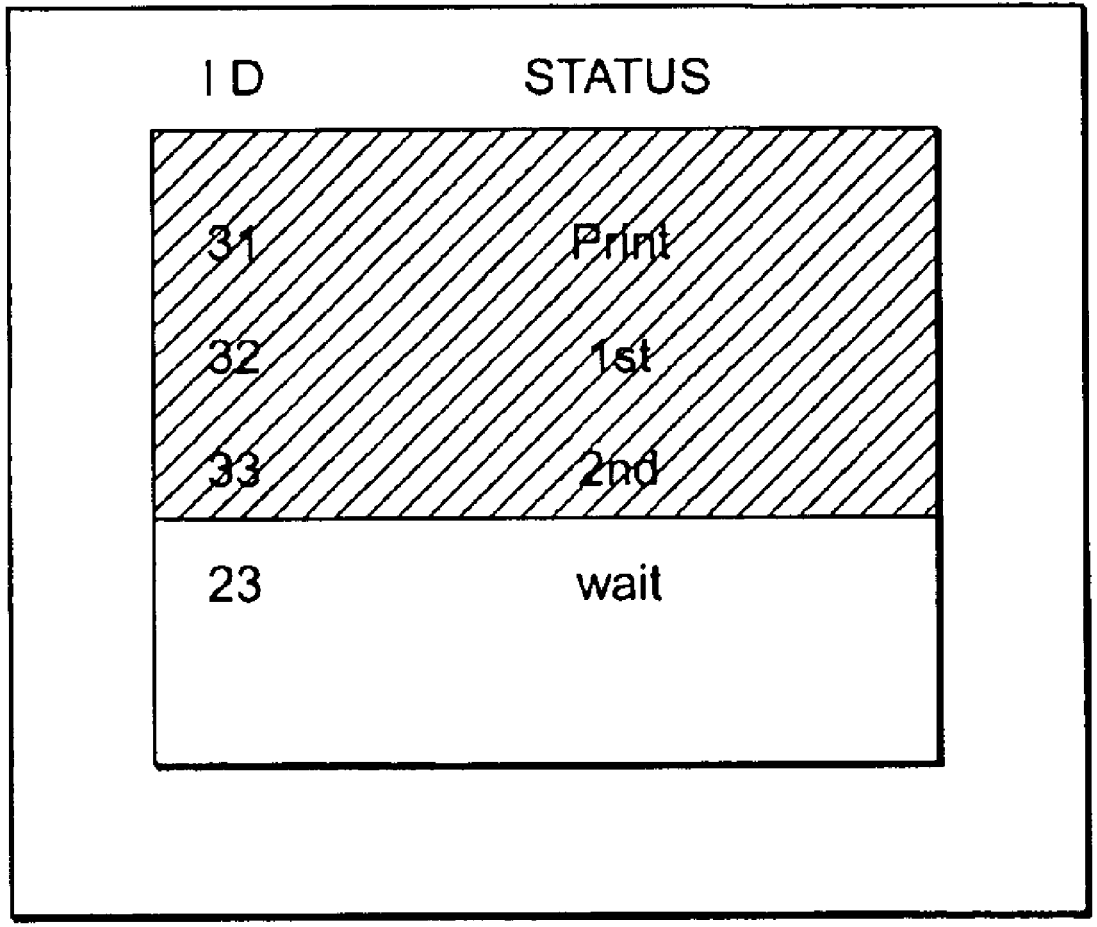

Next, modified examples of a job state listing provided by the integrated job management section 100 will be discussed. FIG. 14 is an illustration to show a modified example of a job state listing. In this example, the display items are limited as compared with the example previously described with reference to FIG. 8. That is, in the example in FIG. 14, only basic information concerning the job state, namely, type, ID (identifier), and status are displayed. The type and status are the same as those in FIG. 8. The ID is an identification number for discriminating one job from another and corresponds to the job name in the example in FIG. 8. The information of the job type, identifier, and processing order status is information required for the user to manipulate the job processing order. To thus limit the display items for listing, in management information integration processing, the job information integration section 200 can also integrate only the information corresponding to the display items into integrated job management information consisting only of the limited items. Information of all items of management information is registered in the integrated job management information and only the display items can also be limited. In FIG. 14, the job name given by the user may be displayed in place of the ID. In FIG. 14, the job type is displayed as one of the display items (type), but may be displayed in a different manner. Copy and print jobs can also be distinguished from each other by changing the display form depending on the job type in such a manner that a copy job is normally displayed and a print job is reverse-displayed, for example, as shown in FIG. 15. In addition, one of print and copy jobs can also be hatched or shaded or print and copy jobs can also be displayed in different colors. The display form for distinguishing copy and print jobs from each other may be selected appropriately in response to the used hardware function (capability of color display, halftone display, or the like).

In comparison between the display examples in FIG. 14 and FIG. 8, the example in FIG. 8 is more convenient for the user because it provides richer display contents. For example, display of the owner enables the user to know his or her job, thus the possibility that he or she will operate a job of another person by mistake can be decreased. The information of the size, the number of pages, and the number of copies can be used to estimate the time required for printing each job. The user can reference such information to estimate how long he or she must wait until completion of processing him or her job. Therefore, the user may receive the processing result at the digital copier 10 at the estimated time and need not wait near the digital copier for the print result to be produced. The user can also determine whether or not the processing turn of his or her job is to be moved up, whether or not his or her job is to be canceled, or th like, based on the estimation.

The display items of the integrated job management information can also be increased or decreased in accordance with user's specification. FIG. 16 shows a display example to increase or decrease the display items. In this display example, a display window 500 contains a display content button 530-6 to change the display items. If the user clicks on the display content button 530-6, a display option window 540 is opened. This window 540 lists the items registered in the integrated job management information 212. To display one item, the user can check the check box to the left of the item to be displayed. The job information display control section 220 selects only the necessary display items out of the integrated job management information 212 in response to the checking and displays the display items.

6. Job Operation Based on Display of Integrated Job Management Information

Next, several specific examples of job operation using a listing of integrated job management information will be discussed using the display example in FIG. 14.

(1) Suspending a Job

To give a job suspension command, the user selects the job to be suspended by clicking thereon, or the like, and click on the suspend button 530-3. The status of the suspended job is set to the suspension state. FIGS. 17(*a*) to (*c*) are illustrations to show a display example of integrated job management information applied when a job suspension command is given. This example shows suspension of the print job with ID number 33. For the suspended job, a mark indicating the suspension state (suspend) is displayed. The suspended job is outstripped by the subsequent jobs until the suspension state is released. That is, in FIG. 17, the job with ID 33 is assigned the second in the processing order and is suspended at the time of FIG. 17(*a*) and upon completion of processing the job with ID 31, the job with ID 33 is moved up one in the processing order and becomes the first as shown in FIG. 17(*b*). If the suspension state is released at the point in time, the job with ID 33 is next processed. However, if the suspension state of the job with ID 33 is not released when processing of the job with ID 32 is complete, the job with ID 33 is held the first in the processing order as shown in FIG. 17(*c*) and the next job with ID 34 is processed first. To release the job suspension state, the user can click on the restart button 530-2.

Figure 18:
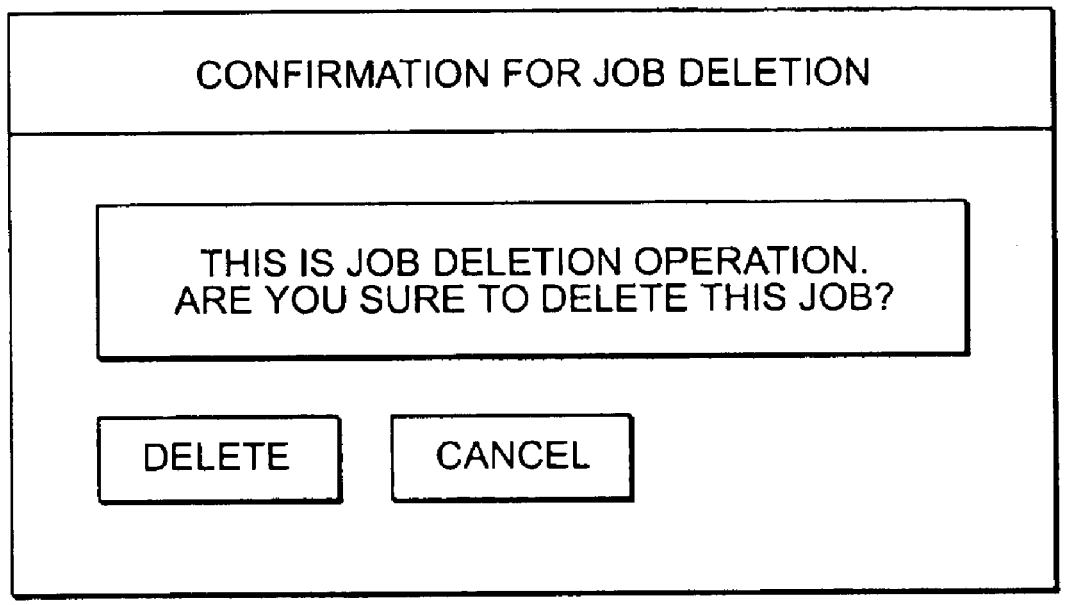
FIG. 18 is an illustration to show an example of a confirmation message for a job deletion.

To delete a job, the user can select the job to be deleted and click on the delete button 530-4. When a job deletion command is given, if a confirmation message is displayed as shown in FIG. 18 for requesting the user to respond with yes (DELETE) or no (CANCEL), job deletion by erroneous operation ca be prevented.

(3) Moving the Job Processing Order

To move the job processing order, the user can select the job whose process order is to be moved by clicking thereon, or the like, click on the move button 530-1, and select move destination. The jobs whose processing order can be moved vary depending on the contention control mode.

For example, FIGS. 19(*a*) to (*d*) are illustrations to describe a move flow of the job processing order in the non-priority mode. In the non-priority mode, basically (namely, unless the authority to operate jobs is limited), the order of all jobs can be moved. In the example in FIGS. 19(*a*) to (*d*), first the user places a cursor on the row of the job to be moved, namely, the job whose processing order is to be changed (in this example, job with ID 32) and clicks the mouse button, whereby the job is selected as the job to be moved and is reverse displayed as shown in FIG. 19(*a*). Next, as shown in FIG. 19(*b*), the user moves the cursor onto the move button 530-1 and clicks on the mouse button. Then, the row of the job (ID 32) selected as the job to be moved is blinked, for example, (surrounded by the dashed line in FIG. 19(*a*) to (*c*) to represent the blink display), pointing out explicitly that the job is to be moved. Next, if the user moves the cursor, the cursor row is reverse-displayed. If the user moves the cursor to the desired move destination row (in the example, the row of the job with ID 33) and clicks the mouse button as shown in FIG. 19(*c*), the move destination is defined. Resultantly, the processing order of the job with ID 32 is changed to that following the job with ID 33. In the example, the processing order of the job to be moved is moved to the next to the selected job as the move destination. In addition, the order of the job to be moved and that of the move destination job may be replaced with each other, for example. To give a job operation cancel command, the user may be able to click a specific mouse button in such a manner that he or she clicks the left button of the mouse to give a job selection or operation command and clicks the right button to cancel the command, for example.

In other modes than the non-priority mode, the jobs to be moved and the move destination selection range are limited. For example, in the first or second print job priority mode, the print job processing order cannot be moved following a copy job and the copy job processing order cannot be moved preceding a print job either (more strictly, such processing order move is meaningless on the definition of the modes). The job processing order can be moved according to the same procedure as in the non-priority mode except for such limitation. If the user wants to execute such move, he or she may change the mode. Order change between print jobs is the most significant in the first or second print job priority mode, but order change between copy jobs can also be admitted. In such a case, preferably, reverse display of an improper row as a move destination (a copy job row if a print job is moved) is suppressed or if the user clicks, selection is suppressed. In the first or second copy job priority mode, the copy job processing order cannot be moved following a print job and the print job processing order cannot be moved preceding a copy job either.

(4) Linked Control of Moving Job Processing Order and Changing Mode

The previous section has described that the jobs whose processing order can be moved and the selection range of job move destinations are limited depending on the contention control mode. A method for taking operation load off the user in making a move outside the admitted range will be discussed.

To make a move outside the admitted range, mode change is involved as described above. However, a sequence of recognizing that the job cannot be moved, then determining which mode to change to for enabling the desired move and changing the mode setup value according to the determination may becomes a burden for the user. Then, considering this point, the embodiment adopts a system wherein if a move outside the admitted range is specified, the integrated job management section 100 prompts the user to change the current mode to an appropriate mode and automatically changes the mode to the appropriate mode if the user approves the mode change.

FIGS. 20(*a*) to (*d*) are illustrations to show an example of a job move operation flow when such system is adopted. First, assume that the user selects a print job with ID 32 as the job to be moved in the first print job priority mode (namely, the mode in which no copy jobs are processed), as shown in FIG. 20(*a*). In this case, assume that the user clicks on the move button and selects a copy job with ID 23 as the move destination, as shown in FIG. 20(*b*). Such move processing is not admitted in the first print job priority mode. Then, the integrated job management section 100 displays a window 550 for inquiring of the user whether or not he or she admits that the non-priority mode is selected as a mode allowing the move processing and the mode is changed from the first print job priority mode to the non-priority mode, as shown in FIG. 20(*c*). If the user clicks on a YES button in response to the inquiry on the window 550, the mode is changed to the non-priority mode and the processing order of the print job with ID 32 is changed to that following the copy job with ID 23, as shown in FIG. 20(*d*). If the user responds to the inquiry on the window 550 with NO, the move operation command is canceled.

(5) Security

If operation of a job is admitted unlimitedly, there is a possibility that the job may be deleted by another person without owner approval of the job or that the processing order of the job may be changed by another person without permission. When a job of more than one user exists in the print system, if one of the users changes the contention control mode in a self-serving manner, other users may be troubled. To solve such a problem, it is considered that the operation range allowed for one user is limited.

Specifically, for example, the users are classified into general users and authorized users such as a system administrator. In this case, the general user are allowed to perform job operation only in the range in which other users are not troubled, such as deletion or suspension of his or her own job or moving down of the order of his or her own job, and the authorized users are allowed to perform every operation including job operation and mode change. To identify the users, a password is preset for each user and when an operation command is given, the print system may request the user to enter his or her password.

The preferred embodiment of the present invention has been described. In the embodiment, the integrated job management section 100 is installed in each of the digital copier 10 and the print server 20. However, installation of the integrated job management section 100 in only either of the digital copier 10 and the print server 20 is also contained in the scope of the present invention. Even in such a case, the user can see the state of copy and print jobs at a glance.

The present invention can also be applied to a network configuration wherein the digital copier 10 is connected directly to a network and communicates with the print server 20 via the network.

Figure 21:
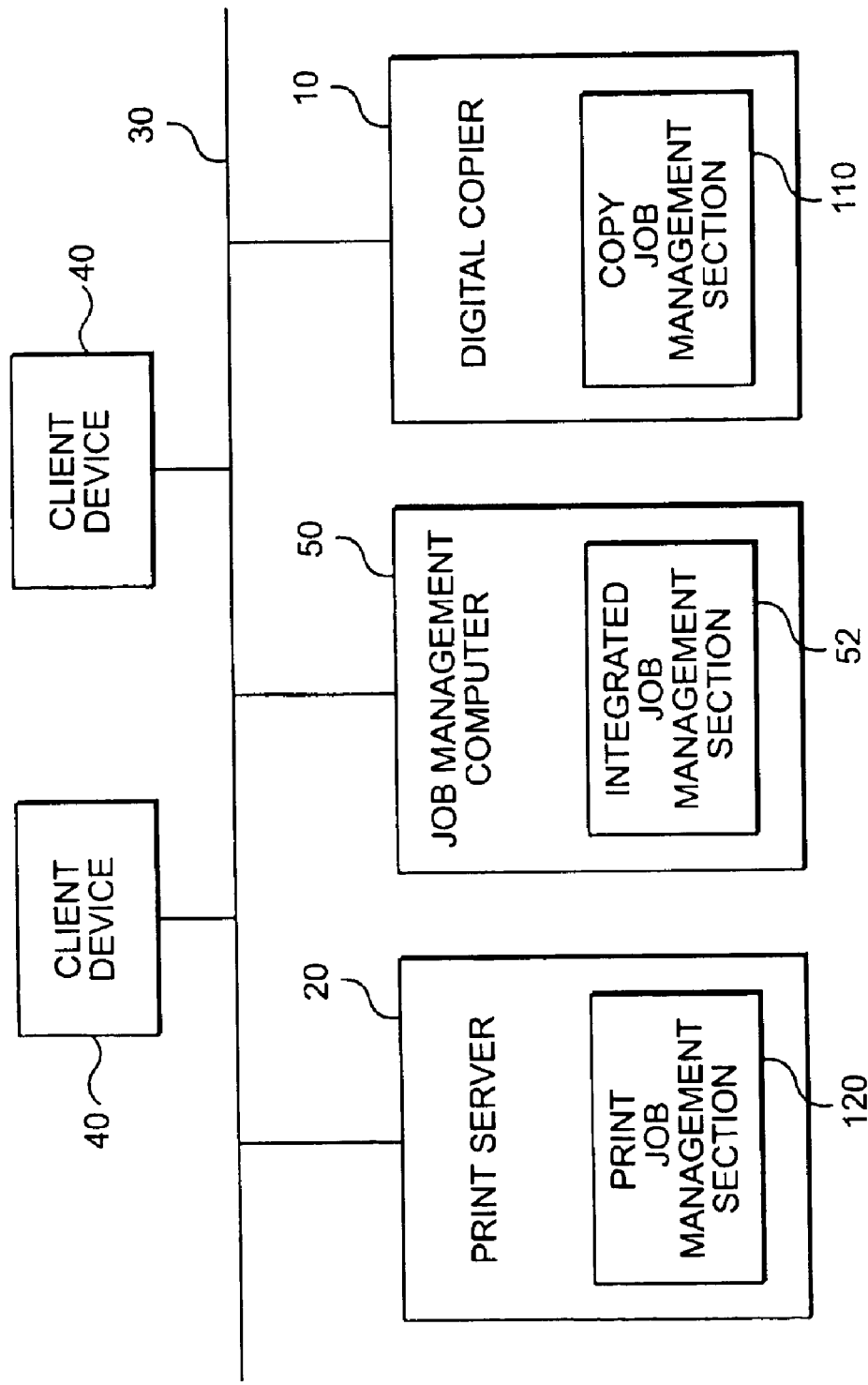
FIG. 21 is a block diagram to show a system configuration example wherein the integrated job management section is installed in a computer which is not a digital copier or a print server.

The function of the integrated job management section may be installed in one of the computers connected to the network instead of placing the integrated job management section in each or only either of the digital copier 10 and the print server 20. FIG. 21 shows an example of such a system configuration. That is, in FIG. 21, a job management computer 50 wherein an integrated job management section 52 is installed is connected to the network 30 to which the digital copier 10 and the print server 20 are connected. The integrated job management section 52 may have the same configuration and function as the above-described integrated job management section 100. In this case, the integrated job management section 52 communicates with the digital copier 10 and the print server 20 via the network 30, integrates management information from the copy job management section 110 and the print job management section 120, and reflects user-entered operation on the job management computer 50 on the management information in the copy job management section 110 and the print job management section 120. To provide the configuration, each of the copy job management section 110 and the print job management section 120 is provided with an interface for transferring information to and from the integrated job management section 52.

Figure 22:
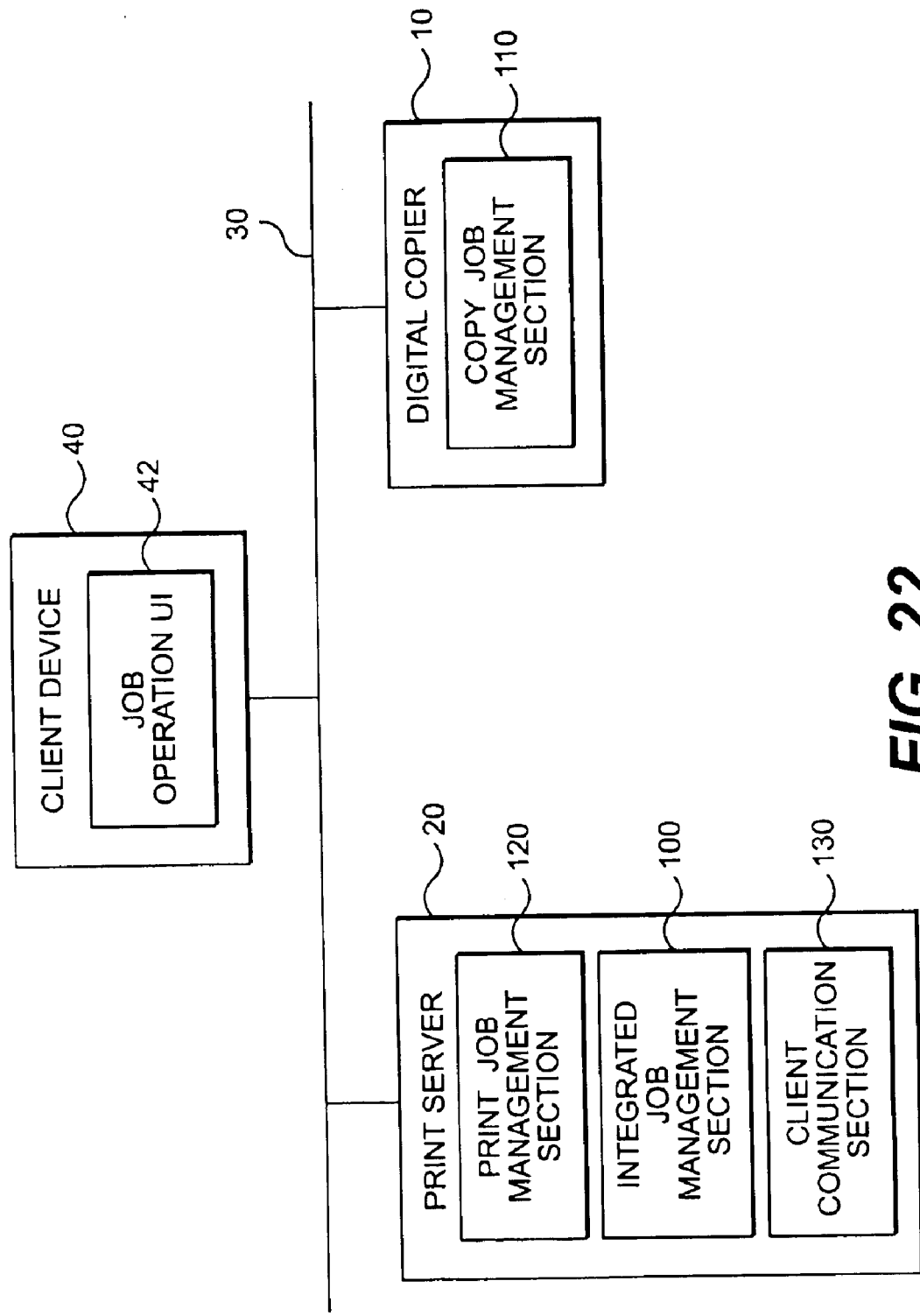
FIG. 22 is a block diagram to show a system configuration example for listing the job state and performing job operation on a client device.

It also makes it possible for a client to display integrated job management information and accept job operation. To do this, the print server 20 may be provided with a client communication section 130 and the client device 40 may be provided with a job operation UI 42, for example, as shown in FIG. 22. The client communication section 130 has a function of transmitting integrated job management information retained in the integrated job management section 100 to the client device 40 and a function of accepting an operation command from the client device 40 and sending it to the integrated job management section 100. The job operation UI 42 prepares a job listing based on the integrated job management information received from the print server 20 and sends an operation command entered by the user based on the listing to the print server 20.

Figure 23:
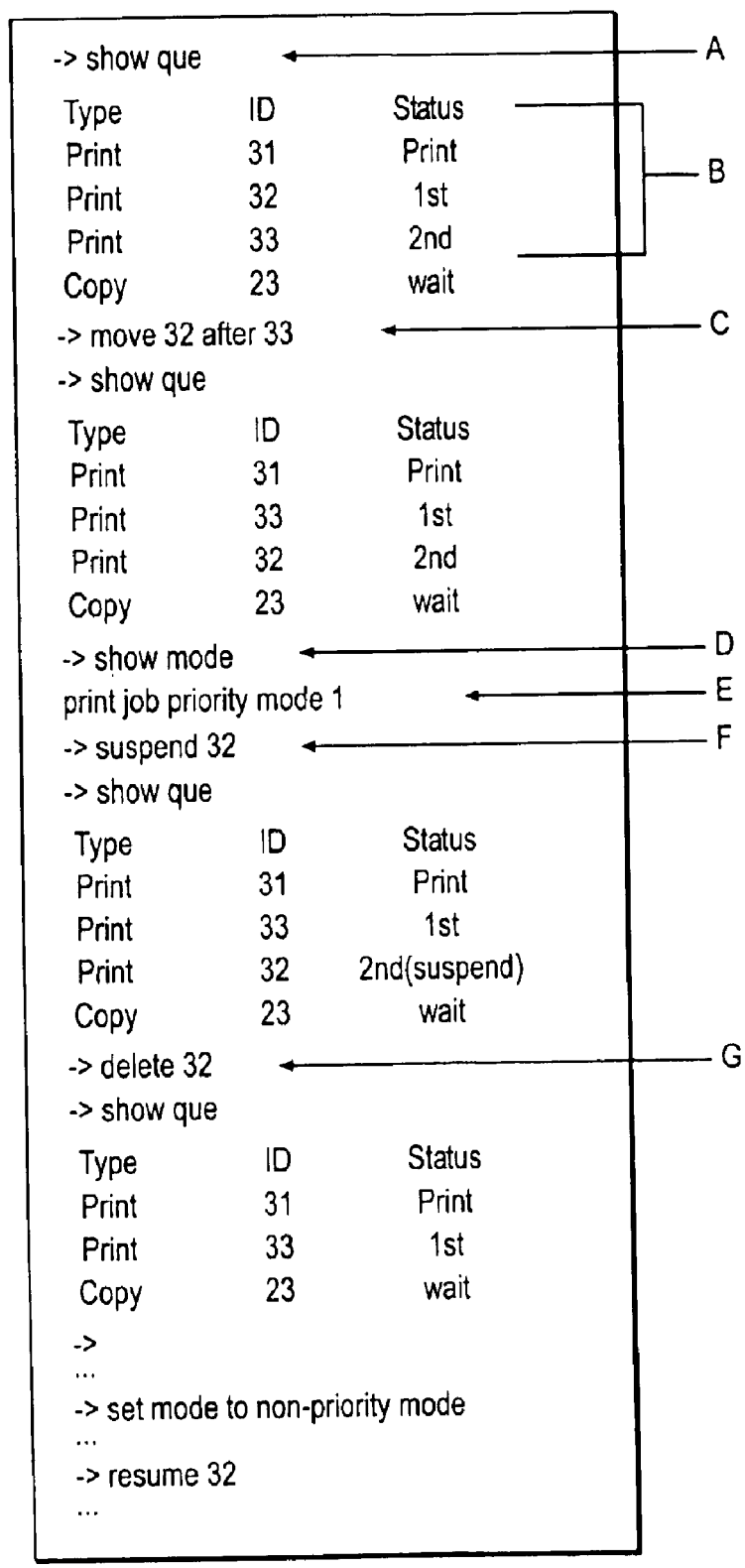
FIG. 23 is an illustration to show a job state listing example on a character display.

In the embodiment, the display examples using the window system are shown each as a job listing. There will be discussed a display example applied in a case that the display of the print server or the digital printer is a unit that cannot utilize the window system, such as a character display. FIG. 23 is an illustration to show such a display example. In FIG. 23, command A is a command for making a request for displaying integrated job management information. If the user enters the command, integrated job management information B is displayed. Command C is a command for moving a job with ID 32 to the row following a job with ID 33. If the integrated job management information display command is entered after the command C is entered, it is seen that the job processing order is changed. Command D is a command for making a request for displaying the content control mode setup value. Mode setup value is displayed in response to the command. Command F is a command for suspending the job with ID 32. Command G is a command for deleting the job with ID 32. Thus, the technique of the embodiment can also be applied to the system using a character display.

Figure 24:
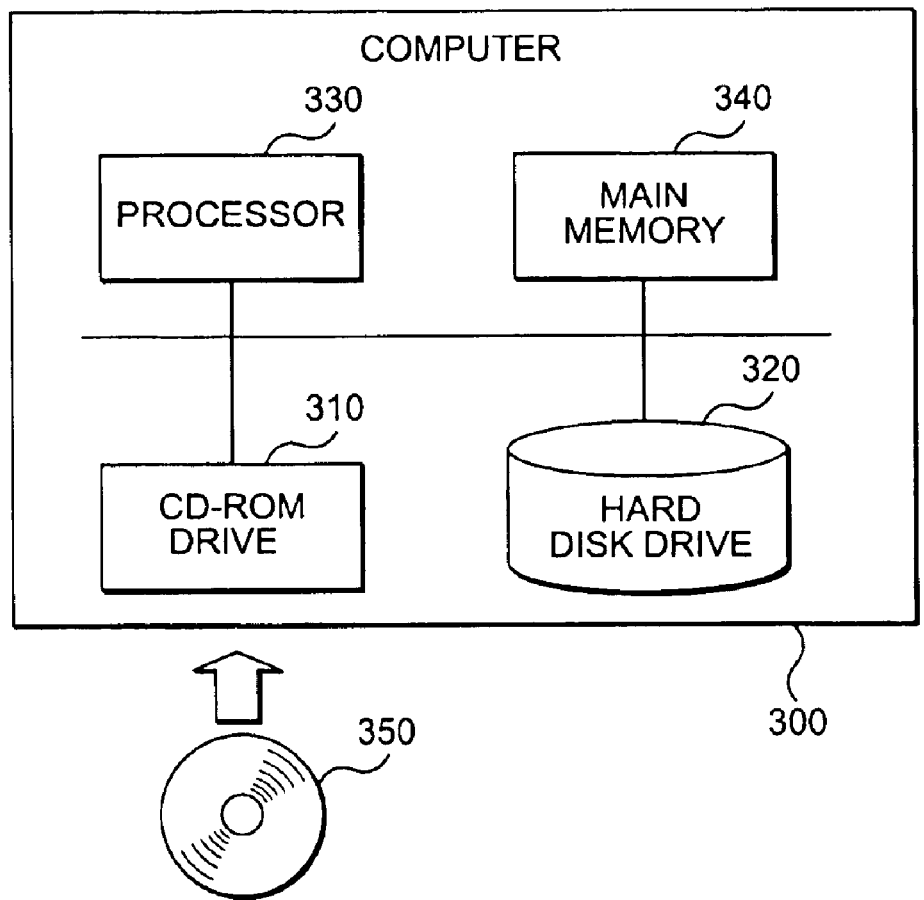
FIG. 24 is a block diagram to show the configuration of a computer in which the embodiment of the present invention is installed.
Figure 25:
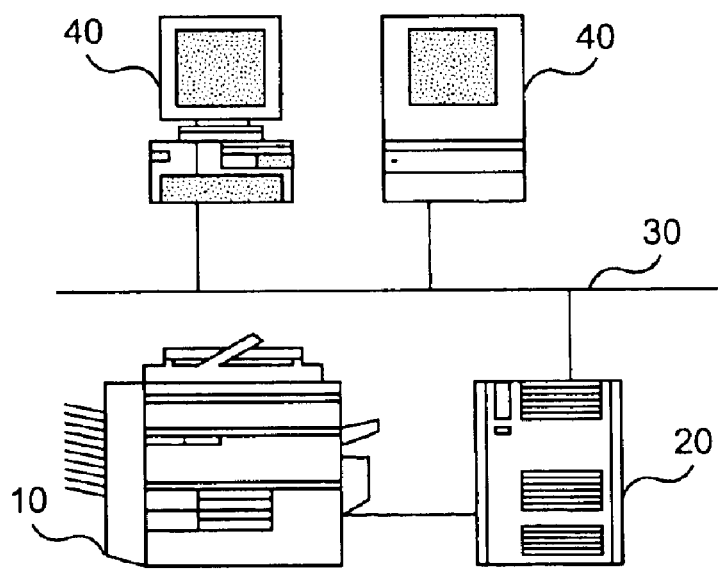
FIG. 25 is a block diagram to show a configuration example of a print system using a digital copier as means for printing.

The configuration of the embodiment described above can be realized by executing a program describing the functions of the integrated job management section 100 on a computer system. This program is distributed to the user in the form of a computer-readable recording medium, such as CD-ROM (compact disk-read-only memory) or floppy disk, into which the program is recorded. For example, as shown in FIG. 24, if the user inserts CD-ROM 360 on which the program is written into a CD-ROM drive 310 of a computer 300, the program is installed on a hard disk drive 320 and becomes executable. The program is loaded into main memory 340 under the control of an operating system, or the like, and is executed by a processor 330, whereby the functions of the embodiment are provided. The computer 300 mentioned here also includes the digital copier 10 or the print server 20.

As has been described heretofore, according to the present invention, the user can see a listing provided by the job information display means to know at a time the current state of the copy jobs managed by the image forming device and the print jobs managed by the print control device.

What is claimed is:

1. A print system for printing image data on paper, comprising:
    a communication line;
    a client device connected to the communication line;
    an image forming device connected to the communication line, having a copy function of printing first image data provided by optically reading an original on paper, having a print function of printing second image data provided through the communication line on paper, storing the first image data as copy jobs, generating copy job management information containing a processing order for the stored copy jobs, and printing the stored copy jobs in order based on the copy job management information;
    a print control device connected to the communication line and separate from the image forming device, storing print jobs input from the client device via the communication line, generating print job management information containing a processing order for the stored print jobs, developing the print jobs into the second image data in order based on the print job management information, and causing the image forming device to print the second image data by inputting thereto via the communication line;

job information integration means for integrating the copy job management information and the print job management information to generate integrated job management information for the copy jobs and the print jobs printed by the image forming device; and job information display means for listing the copy job management information and the print job management information based on the integrated job management information.

2. The print system as set forth in claim 1, wherein the job information integration means determines a status regarding a print processing order in the image forming device with respect to each of the jobs and retains the each status in the integrated job management information, and the job information display means lists the copy job management information and the print job management information based on the each status in a form that the print processing order in the image forming device can be recognized.

3. The print system as set forth in claim 2, wherein the image forming device has a plurality of modes regarding priority relationships for the print processing order among the copy jobs and the print jobs, and stores information for the selected mode therein, and the job information integration means obtains the selected mode information from the image forming device and then determines the each status by adding the selected mode information to the copy job management information and the print job management information.

4. The print system as set forth in claim 3, wherein the job information integration means monitors change of the integrated job management information, and when it is detected one job remaining in a processing wait state for a predetermined time in a state that the same mode continues, the information integration means changes the mode setting so as to print the job.

5. The print system as set forth in claim 3, wherein each of the copy job management information and the print job management information contains information regarding a job type, a job name, a job owner, job data size, number of job pages, number of job copies, and job reception time, and the job information display means lists the copy job management information and the print job management information in a form that at least the job type can be recognized.

6. The print system as set forth in claim 5 further comprising:

job operation input means for accepting a operation command regarding change of the display contents so the operation command as to link with the listing by the job information display means; and job operation reflection means for reflecting the operation command into the listing.

7. The print system as set forth in claim 3 further comprising:

job operation input means for accepting a operation command regarding change of the processing order for the jobs so the operation command as to link with the listing by the job information display means; and job operation reflection means for reflecting the operation command into the copy job management information and the print job management information.

8. The print system as set forth in claim 7, wherein when the accepted operation command is improper for the mode which is currently selected in the image forming device, the job information display means prohibits the operation command from executing and suggests changing into new mode in which the operation command is properly executed.

9. The print system as set forth in claim 1 further comprising:

means for transmitting the integrated job management information to the client device.

10. The print system as set forth in claim 9 further comprising:

job operation reflection means for accepting a operation command with respect to jobs contained in the transmitted integrated job management information to reflect the operation command into the copy job management information and the print job management information.

11. A job management method for a print system which comprises:

a communication line;

a client device connected to the communication line;

an image forming device connected to the communication line, having a copy function of printing first image data provided by optically reading an original on paper, having a print function of printing second image data provided through the communication line on paper, storing the first image data as copy jobs, generating copy job management information containing a processing order for the stored copy jobs, and printing the stored copy jobs in order based on the copy job management information; and a print control device connected to the communication line and separate from the image forming device, storing print jobs input from the client device via the communication line, generating print job management information containing a processing order for the stored print jobs, developing the print jobs into the second image data in order based on the print job management information, and causing the image forming device to print the second image data by inputting thereto via the communication line, the method comprising the steps of:

integrating the copy job management information and the print job management information to generate integrated job management information for the copy jobs and the print jobs printed by the image forming device; and listing the copy job management information and the print job management information based on the integrated job management information.

12. A computer-readable recording medium including a computer program for causing a computer to execute a job management method for a print system, the computer being included in the print system which comprises:

a communication line;

a client device connected to the communication line;

an image forming device connected to the communication line, having a copy function of printing first image data provided by optically reading an original on paper, having a print function of printing second image data provided through the communication line on paper, storing the first image data as copy jobs, generating copy job management information containing a processing order for the stored copy jobs, and printing the stored copy jobs in order based on the copy job management information; and a print control device connected to the communication line and separate from the image forming device, storing print jobs input from the client device via the communication line, generating print job management information containing a processing order for the stored print jobs, developing the print jobs into the second image data in order based on the print job management information, and causing the image forming device to print the second image data by inputting thereto via the communication line, the method comprising the steps of:

integrating the copy job management information and the print job management information to generate integrated job management information for the copy jobs and the print jobs printed by the image forming device; and listing the copy job management information and the print job management information based on the integrated job management information.

* * * * *

UNITED STATES PATENT AND TRADEMARK OFFICE
CERTIFICATE OF CORRECTION

PATENT NO. : 6,894,792 B1
DATED : May 17, 2005
INVENTOR(S) : Masahiko Abe

It is certified that error appears in the above-identified patent and that said Letters Patent is hereby corrected as shown below:

Column 17,
Lines 53 and 61, "a operation" should read -- an operation --.
Lines 55 and 63, "as to link" should read -- has to link --.

Column 18,
Line 12, "a operation" should read -- an operation --.

Signed and Sealed this

Thirteenth Day of September, 2005

JON W. DUDAS
*Director of the United States Patent and Trademark Office*